US010798253B2

(12) United States Patent
Garcia Martin et al.

(10) Patent No.: US 10,798,253 B2
(45) Date of Patent: Oct. 6, 2020

(54) METHODS, DEVICES, AND COMPUTER PROGRAMS FOR ENABLING THE SPONSORING OF DATA CONNECTIVITY

(71) Applicant: Telefonaktiebolaget LM Ericsson (publ), Stockholm (SE)

(72) Inventors: Miguel Angel Garcia Martin, Madrid (ES); Pablo Martinez De La Cruz, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 45 days.

(21) Appl. No.: 15/521,686

(22) PCT Filed: Nov. 5, 2014

(86) PCT No.: PCT/EP2014/073804
§ 371 (c)(1),
(2) Date: Apr. 25, 2017

(87) PCT Pub. No.: WO2016/070912
PCT Pub. Date: May 12, 2016

(65) Prior Publication Data
US 2017/0251109 A1 Aug. 31, 2017

(51) Int. Cl.
*H04M 15/00* (2006.01)
*H04L 12/14* (2006.01)
(Continued)

(52) U.S. Cl.
CPC .......... *H04M 15/66* (2013.01); *H04L 12/141* (2013.01); *H04L 12/1407* (2013.01);
(Continued)

(58) Field of Classification Search
CPC .......... H04M 15/66; H04M 2215/0192; H04L 12/1407
(Continued)

(56) References Cited

U.S. PATENT DOCUMENTS 9,125,179 B2 *  9/2015  Seok ................. H04W 76/10
2012/0005304 A1 *  1/2012  Guo .................. H04L 12/1836
709/217

(Continued)

FOREIGN PATENT DOCUMENTS

EP        2 571 311       3/2013
JP        2002-74094      3/2002
WO    WO 2013 142331     9/2013

OTHER PUBLICATIONS

3GPP TS 23.402 v12.5.0; Technical Specification; 3rd Generation Partnership Project; Technical Specification Group Services and System Aspects; Architecture Enhancements for Non-3GPP Accesses (Release 12)—Jun. 2014 .

(Continued)

*Primary Examiner* — Nghi H Ly
(74) *Attorney, Agent, or Firm* — Patent Portfolio Builders, PLLC

(57) ABSTRACT

In a telecommunication network, a method is carried out for assisting a first user terminal ($100_1$) in benefiting from a data connectivity. A second user terminal ($100_2$) indicates (s10), to a connectivity donation server (200), that it is willing to sponsor data connectivity of the first terminal ($100_1$) and that, restriction(s) are imposed on how the sponsored connectivity can be used. The restriction(s) comprise: i) where the first terminal ($100_1$) is to be located for benefiting from the sponsored connectivity; and ii) which access network(s) the first terminal ($100_1$) has to connect to for benefiting from the sponsored connectivity. The connectivity donation server (200) then transmits a token to the second terminal ($100_2$), which in turn transmits (s30) it to the first terminal ($100_1$) using proximity-based means. Terminals, network nodes, and computer programs for use in the above method are also disclosed.

23 Claims, 14 Drawing Sheets

(51) Int. Cl.
*H04W 4/24* (2018.01)
*H04W 4/80* (2018.01)
*H04W 28/20* (2009.01)
*H04W 48/16* (2009.01)

(52) U.S. Cl.
CPC ...... *H04L 12/1475* (2013.01); *H04L 12/1496* (2013.01); *H04M 15/8033* (2013.01); *H04M 15/8083* (2013.01); *H04M 15/93* (2013.01); *H04W 4/24* (2013.01); *H04W 4/80* (2018.02); *H04W 28/20* (2013.01); *H04W 48/16* (2013.01); *H04M 2215/0192* (2013.01)

(58) Field of Classification Search
USPC ................ 455/406, 405, 519, 41.1, 422.1, 7
See application file for complete search history.

(56) References Cited

U.S. PATENT DOCUMENTS

| | | | | |
|---|---|---|---|---|
| 2013/0155947 A1* | 6/2013 | Curlander | ............... | H04W 4/38 370/328 |
| 2014/0171062 A1* | 6/2014 | Fallgren | ............... | H04W 40/22 455/422.1 |
| 2014/0280941 A1* | 9/2014 | Maguire | ............... | H04L 67/10 709/225 |
| 2015/0207942 A1* | 7/2015 | Bakthavachalu | .. | H04N 1/00307 358/1.15 |
| 2016/0134760 A1* | 5/2016 | Castro Castro | ..... | H04L 12/1407 455/406 |

OTHER PUBLICATIONS

3GPP TS 32.240 v12.4.1; Technical Specification; 3rd Generation Partnership Project; Technical Specification Group Services and System Aspects; Telecommunication Management; Charging Management; Charging Architecture and Principles (Release 12)—Jun. 2014.

3GPP TS 24.312 v12.5.0; Technical Specification; 3rd Generation Partnership Project; Technical Specification Group Core Network and Terminals; Access Network Discovery and Selection Function (ANDSF) Management Object (MO) (Release 12)—Jun. 2014.

3GPP TS 23.203 v12.5.0; Technical Specification; 3rd Generation Partnership Project; Technical Specification Group Services and System Aspects; Policy and charging control architecture (Release 12)—Jun. 2014 .

International Search Report for International application No. PCT/EP2014/073804—dated Jul. 14, 2015.

3GPP TS 29.219 v12.2.0; Technical Specification; 3rd Generation Partnership Project; Technical Specification Group Core Network and Terminals; Policy and Charging Control; Spending Limit Reporting Over Sy Reference Point (Release 12)—Jun. 2014.

3GPP TS 24.302 v12.5.0; Technical Specification; 3rd Generation Partnership Project; Technical Specification Group Core Network and Terminals; Access to the 3GPP Evolved Packet Core (EPC) via non-3GPP Access Networks; Stage 3 (Release 12)—Jun. 2014.

European Office Action issued in application No. 14796036.3 dated Jan. 22, 2019, 9 pages. The references not cited therein have been previously made of record.

* cited by examiner

METHODS, DEVICES, AND COMPUTER PROGRAMS FOR ENABLING THE SPONSORING OF DATA CONNECTIVITY

PRIORITY

This nonprovisional application is a U.S. National Stage Filing under 35 U.S.C. § 371 of International Patent Application Serial No. PCT/EP2014/073804 filed Nov. 5, 2014, and entitled "Methods, Devices, And Computer Programs For Enabling The Sponsoring Of Data Connectivity."

TECHNICAL FIELD

The present invention relates to methods for assisting a user terminal in benefiting from a data connectivity. The invention also relates to devices for participating in such methods, and to computer programs therefor.

BACKGROUND

The deployment of radio access network technologies in parallel to cellular networks, combined with the widespread use of multimode mobile communication devices, has created the opportunity to offload mobile communications to, for example, wireless access networks (such as: wireless local area networks—also known as "Wi-Fi" networks—and wireless metropolitan area networks—also known as "WiMax" networks) in order to alleviate congestion in cellular networks. These offloading techniques also enable telecommunication operators to increase their capacity and data coverage. Many wireless LANs have been deployed in airports, train stations, restaurants, hotels, libraries, campuses, etc., and their number is growing. At the same time, the data traffic going through mobile communication networks is growing as well. Efforts have been made to standardize, at least to a certain extent, cellular and wireless LANs interworking procedures, such as for example the procedures for initiating the offloading of a communication.

In that context, entities hosting an Access Network Discovery and Selection Function (ANDSF) are used to provide user terminals with rules to discover and select access networks, to prioritize particular access networks and to manage the corresponding connections, so as to efficiently implement the offloading of a communication to a 3GPP or non-3GPP access network. An ANDSF typically enables the selection of an access network for a user terminal so that the user terminal may connect to a given network such as for example the Internet.

The ANDSF functionality is notably discussed in (i) 3GPP TS 24.312 V12.5.0 (2014-06), "3rd Generation Partnership Project; Technical Specification Group Core Network and Terminals; Access Network Discovery and Selection Function (ANDSF) Management Object (MO) (Release 12)"; (ii) 3GPP TS 24.302 V12.5.0 (2014-06), "3rd Generation Partnership Project; Technical Specification Group Core Network and Terminals; Access to the 3GPP Evolved Packet Core (EPC) via non-3GPP access networks; Stage 3 (Release 12)"; and (iii) 3GPP TS 23.402 V12.5.0 (2014-06), "3rd Generation Partnership Project; Technical Specification Group Services and System Aspects; Architecture enhancements for non-3GPP accesses (Release 12)", which are available from the 3GPP web site: http://www.3gpp.org/.

The ANDSF contains data management and control functions to provide network discovery and selection assistance data to user terminals over the S14 interface (i.e., reference point) as per operators' policy. Two modes of operation are defined over the S14 interface for transferring access network policy information from an ANDSF to a user terminal: a "pull" mode, which allows the user terminal to fetch access network discovery and selection policies from the ANDSF, and a "push" mode, which allows the ANDSF to indicate to one or more user terminals that they should fetch policies from the ANDSF. An ANDSF client runs in the user terminal in order to communicate with an ANDSF server.

The sponsoring of data connectivity by an entity such as an application provider is known from 3GPP TS 23.203 V12.5.0 (2014-06), "3rd Generation Partnership Project; Technical Specification Group Services and System Aspects; Policy and charging control architecture (Release 12)" (hereinafter referred to as reference [1]), Annex N.

Document S1-122356, "Support for Service Sharing in MOSAP", 3GPP TSG-SA WG1#59, Chicago, USA, 30 July-3 Aug. 2012, relates to sharing of data application service between different subscribers, e.g. between friends or relatives. In particular, a user may send "a digital invitation to a friend, who may access the sponsored service later on (e.g. within one week)".

WO2013/142331A1 relates to enabling a user to sponsor another user for an application service. A sponsoring request procedure may involve a wireless transmit/receive unit (WTRU1) sending a sponsorship request message to an application server (AS) offering to sponsor another wireless transmit/receive unit (WTRU2) and providing WTRU2's identity, "as well as scope information about the sponsoring, (e.g., limitation in terms of cost or service duration, as access to a particular content or category of content)" (paragraph [0101]).

It is desirable to enable user terminals to sponsor other user terminals in a more convenient and flexible manner, to efficiently and controllably connect user terminals to access networks.

SUMMARY

To meet or at least partially meet the above-mentioned goals, methods, user terminals and network nodes according to the invention are defined in the independent claims. Particular embodiments are defined in the dependent claims.

In one embodiment, a method is carried out in a telecommunication network for assisting a user terminal (hereinafter referred to as "first user terminal") in benefiting from a data connectivity. In the method, another user terminal (hereinafter referred to as "second user terminal") indicates, to a network node (hereinafter referred to as "connectivity donation server"), that the second user terminal is willing to sponsor data connectivity of the first user terminal and that at least one restriction is to be imposed on how the sponsored data connectivity can be used by the first user terminal. The at least one restriction comprises at least one of: (i) where the first user terminal is to be located for benefiting from the sponsored data connectivity; and (ii) which access network(s) the first user terminal has to connect to for benefiting from the sponsored data connectivity. The connectivity donation server (CDS) then transmits a token to the second user terminal, and the second user terminal transmits the token to the first user terminal using proximity-based means, i.e. proximity-based communication means.

This enables a user terminal (i.e., a so-called "second user terminal") to conveniently and flexibly sponsor another user terminal's data connectivity. For example, a user may donate data connectivity to one or several of his or her friends, relatives, colleagues, or employees. Furthermore, when the second user terminal indicates, to the CDS, its willingness to sponsor data connectivity of the first user terminal, the second user terminal also indicates that some restriction(s), i.e. limitations and/or conditions, are to be imposed on how the sponsored data connectivity can be used by the first user terminal. The restriction(s) are indicated by the second user terminal, rather than chosen (e.g. by default) by the network. As mentioned above, the restrictions relate at least to (i) the location(s) where the sponsored data connectivity can be used, and/or (ii) the access network(s) through which sponsored data connectivity can be used.

The invention also relates, in one embodiment, to a method carried out by a second user terminal for assisting a first user terminal in benefiting from a data connectivity. In the method, the second user terminal indicates to a network node (referred to as "connectivity donation server" or CDS) that the second user terminal is willing to sponsor data connectivity of the first user terminal and that at least one restriction is to be imposed on how the sponsored data connectivity can be used by the first user terminal. The at least one restriction comprises at least one of: (i) where the first user terminal is to be located for benefiting from the sponsored data connectivity; and (ii) which access network(s) the first user terminal has to connect to for benefiting from the sponsored data connectivity. The second user terminal then receives a token from the CDS, and the second user terminal transmits the token to the first user terminal using proximity-based means.

The invention further relates, in one embodiment, to a method carried out by a network node (referred to as "connectivity donation server" or CDS) for assisting a first user terminal in benefiting from a data connectivity. In the method, the CDS receives an indication, from a second user terminal, that the second user terminal is willing to sponsor data connectivity of the first user terminal and that at least one restriction is to be imposed on how the sponsored data connectivity can be used by the first user terminal. The at least one restriction comprises at least one of: (i) where the first user terminal is to be located for benefiting from the sponsored data connectivity; and (ii) which access network(s) the first user terminal has to connect to for benefiting from the sponsored data connectivity. Then, the CDS sends a token to the second user terminal.

The invention further relates, in one embodiment, to a method carried out by a first user terminal for benefiting from a data connectivity. In the method, the first user terminal receives a token from a second user terminal through proximity-based means. The token identifies the second user terminal's willingness to sponsor data connectivity of the first user terminal considering that at least one restriction is to be imposed on how the sponsored data connectivity can be used by the first user terminal, wherein the at least one restriction comprises at least one of: (i) where the first user terminal is to be located for benefiting from the sponsored data connectivity; and (ii) which access network(s) the first user terminal has to connect to for benefiting from the sponsored data connectivity.

The invention also relates, in one embodiment, to a user terminal (referred to as "second user terminal") for participating in assisting another user terminal (referred to as "first user terminal") in benefiting from a data connectivity. The second user terminal comprises a so-called "indicating unit", a so-called "receiving unit", and a so-called "transmitting unit". The indicating unit is configured for indicating to a network node (referred to as "connectivity donation server" or CDS) that the second user terminal is willing to sponsor data connectivity of the first user terminal and that at least one restriction is to be imposed on how the sponsored data connectivity can be used by the first user terminal. The at least one restriction comprises at least one of: (i) where the first user terminal is to be located for benefiting from the sponsored data connectivity; and (ii) which access network(s) the first user terminal has to connect to for benefiting from the sponsored data connectivity. The receiving unit is configured for receiving a token from the CDS. The transmitting unit is configured for transmitting the token to the first user terminal using proximity-based means.

The invention further relates, in one embodiment, to a network node (referred to as "connectivity donation server") configured for participating in assisting a first user terminal in benefiting from a data connectivity. The network node comprises a so-called "receiving unit" and a so-called "sending unit". The receiving unit is configured for receiving an indication, from a second user terminal, that the second user terminal is willing to sponsor data connectivity of the first user terminal and that at least one restriction is to be imposed on how the sponsored data connectivity can be used by the first user terminal. The at least one restriction comprises at least one of: (i) where the first user terminal is to be located for benefiting from the sponsored data connectivity; and (ii) which access network(s) the first user terminal has to connect to for benefiting from the sponsored data connectivity. The sending unit is configured for sending a token to the second user terminal.

The invention further relates, in one embodiment, to a user terminal (referred to as "first user terminal") for benefiting from a data connectivity. The first user terminal comprises a so-called "receiving unit". The receiving unit is configured for receiving a token from another user terminal (referred to as "second user terminal"), using proximity-based means. The token identifies the second user terminal's willingness to sponsor data connectivity of the first user terminal considering that at least one restriction is to be imposed on how the sponsored data connectivity can be used by the first user terminal, wherein the at least one restriction comprises at least one of: (i) where the first user terminal is to be located for benefiting from the sponsored data connectivity; and (ii) which access network(s) the first user terminal has to connect to for benefiting from the sponsored data connectivity.

The invention also relates to a system of user terminal(s) and network node(s) as described above, implemented for example using a set of programmed computers or the like.

The invention also relates to computer programs, computer program products and storage mediums comprising computer-readable instructions configured, when executed on network nodes or user terminals, to cause the network nodes or user terminals to participate in a method according to any one of the above-described embodiments, or to implement the functions of a network node or user terminal according to any one of the above-described embodiments.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims. A list of abbreviations and their meaning is provided at the end of the detailed description.

Figure 1:
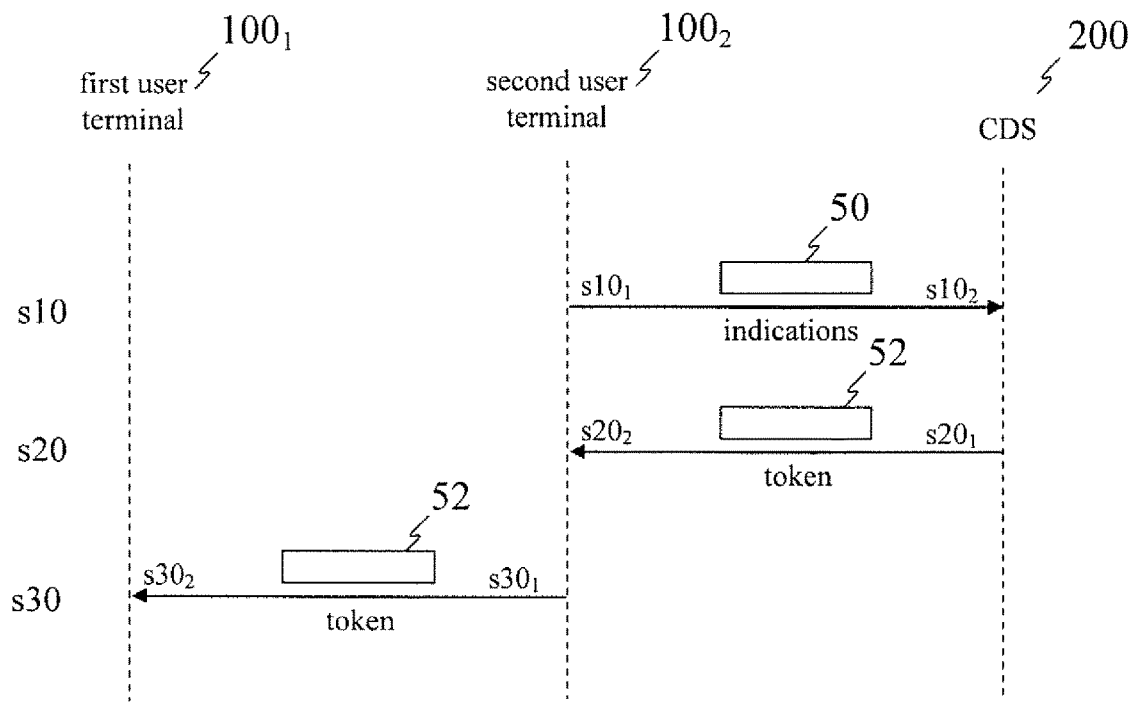
FIG. 1 is a message sequence chart of a method in one embodiment of the invention.

FIG. 1 is a message sequence chart of a method in one embodiment of the invention. The purpose of the method is to assist a user terminal $100_1$ in benefiting from a data connectivity, i.e. from a form of data connectivity being sponsored by another user terminal.

The data connectivity may be provided through an access network which may for example be, but is not limited to, a 3GPP radio access network, a wireless local area network interoperable with IEEE 802.11 standards, a wireless metropolitan area network interoperable with IEEE 802.16 standards, a personal area network interoperable with Bluetooth standards, a personal area network interoperable with ZigBee standards, or a local area network interoperable with IEEE 802.3 standards (Ethernet). The method may assist a first user terminal $100_1$ in benefitting from an access network thanks to the first user terminal's data connectivity being sponsored by a second user terminal $100_2$. The method may also assist the first user terminal $100_1$ in selecting to which access network to connect among a plurality of available access networks, and in switching to the selected access network.

In step s10, the second user terminal $100_2$ indicates to a connectivity donation server (CDS) 200 that second user terminal $100_2$ is willing to sponsor data connectivity of first user terminal $100_1$. Second user terminal $100_2$ also indicates to CDS 200 that at least one restriction is to be imposed on how the sponsored data connectivity can be used by first user terminal $100_1$. In particular, the at least one restriction comprises at least one of: (I) where first user terminal $100_1$ is to be located for benefiting from the sponsored data connectivity; and (ii) which access network(s) the first user terminal $100_1$ has to connect to for benefiting from the sponsored data connectivity.

The above-described indication(s) 50 (indicating the willingness to sponsor the data connectivity and the restriction(s)) may be transmitted from second user terminal $100_2$ to CDS 200 in a message, i.e. a set of bits forming a packet which can be transmitted over a communication network. The indications may also be transmitted through a series of packets. The indications may for example be transmitted in an IP packet. The indication may be transmitted from second user terminal $100_2$ to CDS 200 through one or more intermediate network nodes (not illustrated in FIG. 1), such as for example nodes of a cellular access network or packet core network in a mobile or fixed communication network.

The indication(s) 50 may be transmitted in any suitable format. For example, the indication(s) 50 may be carried in an ANDSF Management Object (MO), and in particular as an information element of an ANDSF MO.

In step s20, CDS 200 transmits a token 52 to second user terminal $100_2$. Token 52 is or may be regarded as a transaction identifier or sponsoring invitation identifier.

Like the above-described indication(s) 50, token 52 may be transmitted in a message, i.e. a set of bits forming a packet which can be transmitted over a communication network. Token 52 may also be transmitted through a series of packets. Token 52 may for example be transmitted in an IP packet. Token 52 may be transmitted from CDS 200 to second user terminal $100_2$ through one or more intermediate network nodes (not illustrated in FIG. 1), such as for example nodes of a cellular access network or packet core network in a mobile or fixed communication network.

In step s30, second user terminal $100_2$ transmits token 52, using proximity-based means, to first user terminal $100_1$. The proximity-based means, or proximity-based communication means, may for example comprise, or consist in, near field communication (NFC), communication by means of a radio-frequency identification (RFID) tag, communication by means of a visual tag, or a combination thereof. The use of a NFC is particularly advantageous since user terminals 100 capable of NFC communication (i.e., NFC-enabled user terminals 100) are nowadays widespread. In addition, information can be transferred to first user terminal $100_1$ in a convenient, fast and relatively secure manner. The solution merely requires the users to approach their user terminals from one another. No other user intervention is required.

The visual tag is a tag that is optically readable by a machine and especially by a first user terminal $100_1$. The tag may for example be displayed on the second user terminal's $100_2$ screen so as to be readable by means of the first user terminal's $100_1$ camera and software or hardware means to extract data from the picture taken by the camera. The visual tag may for example comprise, or consist in, a barcode, which may be, but is not limited to, a linear barcode (also called one dimensional barcode), a two-dimensional barcode (such as for example a matrix barcode) or a combination of both a linear barcode and a two-dimensional barcode. The two-dimensional barcode may for example be a QR code. The use of the QR code is particularly advantageous because the QR code can be read quickly and it has a relatively large storage capacity compared to a one-dimensional barcode. The barcode may however have any geometry.

User terminal $100_1$, $100_2$ may be any type of communication terminal (or user equipment (UE)) such as, for example, a mobile phone, a smartphone, a laptop, a desktop computer, a tablet PC, a watch phone, a gaming device, an e-book reader, a fixed telephone, etc. In one embodiment, user terminals $100_1$, $100_2$ are multimode wireless communication devices. In one embodiment, user terminals $100_1$, $100_2$ are devices which operation is driven by a human user. In another embodiment, user terminals $100_1$, $100_2$ are self-operable and do not require a human operating the device for communicating with a telecommunications system. User terminals $100_1$, $100_2$ may for example be smart devices. User terminals $100_1$ and $100_2$ may be of the same type or of a different type. A user terminal may be capable of acting both as a first and second user terminal $100_1$, $100_2$.

CDS 200 is a network node, i.e. a control server, from which connectivity donation information, such as a token 52 or transaction identifier, can be obtained. In one embodiment, CDS 200 is collocated with at least one of: a) an online charging system (OCS), b) a policy and charging rules function (PCRF), and c) an ANDSF.

After the steps illustrated in FIG. 1, first user terminal $100_1$ may actually connect to an access network, and a core network connected thereto, to benefit from the sponsored data connectivity (not illustrated in the drawings). If the restriction(s) specified by second user terminal $100_2$, and sent to CDS 200, comprise(s) information regarding which access network(s) the first user terminal $100_1$ has to connect to for benefiting from the sponsored data connectivity, first user terminal $100_1$ complies with the access network restriction(s) when connecting to an access network. That is to say that first user terminal $100_1$ connects to an access network initially specified by second user terminal $100_2$. The same applies to the location restriction(s). If a location restriction has been specified, first user terminal $100_1$ complies with it when seeking to benefit from, and especially when benefiting from, the sponsored data connectivity.

In one embodiment (not illustrated in the drawings), the at least one restriction further comprises at least one of: a) which service or services the first user terminal $100_1$ can access when the sponsored data connectivity is being used; b) a maximum quality of service (QoS) the first user terminal $100_1$ can enjoy when benefiting from the sponsored data connectivity, c) a maximum volume of data the first user terminal $100_1$ can enjoy when benefiting from the sponsored data connectivity, d) a maximum bandwidth the first user terminal $100_1$ can enjoy when benefiting from the sponsored data connectivity, e) a maximum downlink bandwidth the first user terminal $100_1$ can enjoy when benefiting from the sponsored data connectivity, f) a maximum uplink bandwidth the first user terminal $100_1$ can enjoy when benefiting from the sponsored data connectivity, g) a duration during which the first user terminal $100_1$ can enjoy the sponsored data connectivity, and h) a period or periods of time during which the first user terminal $100_1$ can enjoy the sponsored data connectivity.

In one embodiment, more than the token 52 is sent from second user terminal $100_2$ to first user terminal $100_1$. In particular, a description accompanying the token 52 may be provided to present, to the user of the first terminal $100_1$, the sponsoring offer and the restrictions associated therewith. While the token 50 is transmitted by the proximity-based means, the above-mentioned description may be transmitted by the proximity-based means used for transmitting the token 52, by other proximity-based means than those used for transmitting the token 52, or by other means, such as for example by SMS or e-mail.

Figure 2:
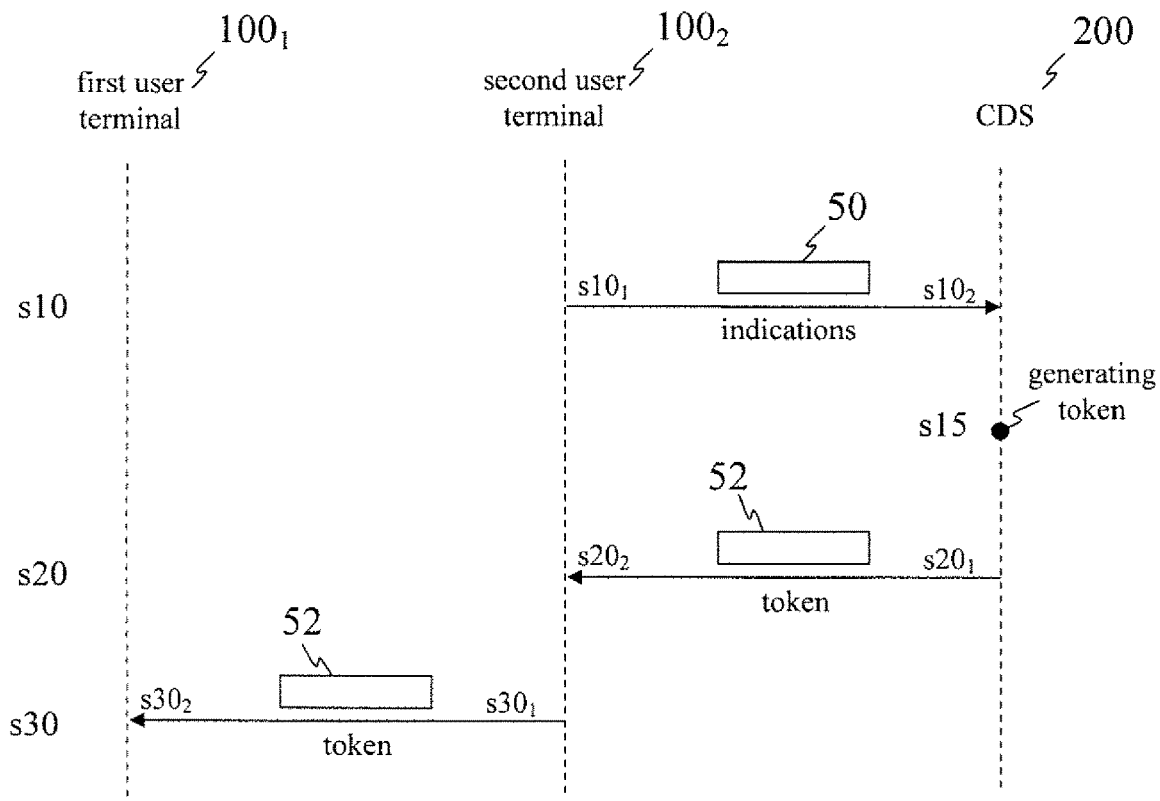
FIG. 2 is a message sequence chart of a method in another embodiment of the invention, which differs from FIG. 1 in that the CDS generates the token.

FIG. 2 is a message sequence chart of a method in another embodiment of the invention, which differs from the one of FIG. 1 as follows. After receiving $s10_2$ the indication(s) 50, CDS 200 generates s15 token 52, which is then transmitted s20 to second user terminal $100_2$. The token 52 may however be generated by another network node than CDS 200, and then transmitted to CDS 200. CDS 200 may store, for example in an internal or external database, the token 52. The token 52 may be stored in association with an identifier of the second user terminal $100_2$ that triggered the creation of the token 52.

Figure 3:
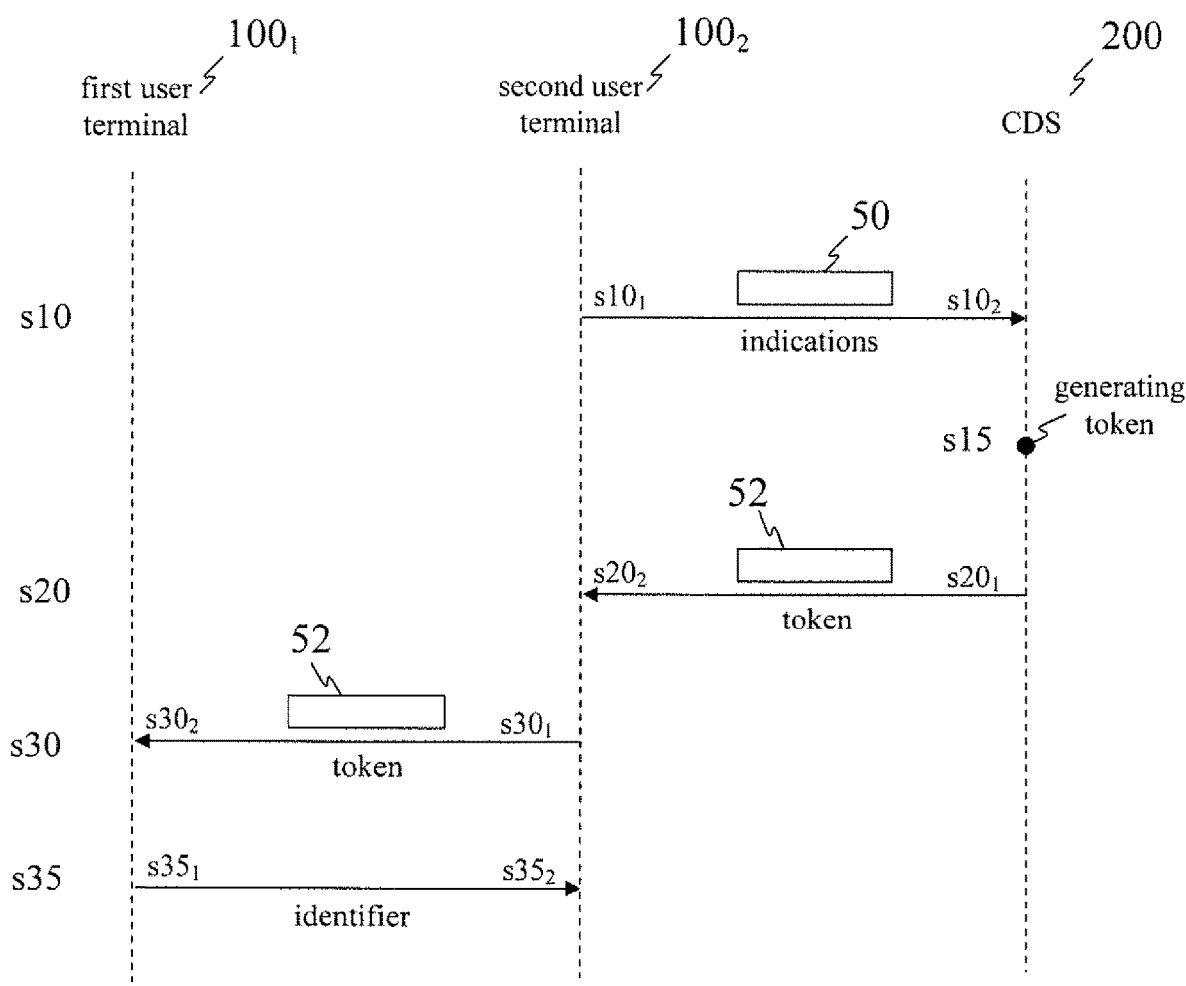
FIG. 3 is a message sequence chart of a method in another embodiment of the invention, which differs from FIG. 2 in that, after receiving the token from the second user terminal, the first user terminal sends its identifier to the second user terminal.

FIG. 3 is a message sequence chart of a method in another embodiment of the invention, which differs from FIG. 2 as follows. After receiving token 52 from second user terminal $100_2$, first user terminal $100_1$ sends s35 its identifier, or one of its identifiers, to second user terminal $100_2$. The identifier may for example be a) the IMSI stored in the Universal Integrated Circuit Card (UICC) that is loaded into the first user terminal's $100_1$, b) the MSISDN associated to the user of the first user terminal $100_1$, or c) both its IMSI and MSISDN. In such a manner, second user terminal $100_2$ can later conveniently provide to CDS 200 precise information about the first user terminal $100_1$ to which the data connectivity sponsorship is directed.

Figure 4:
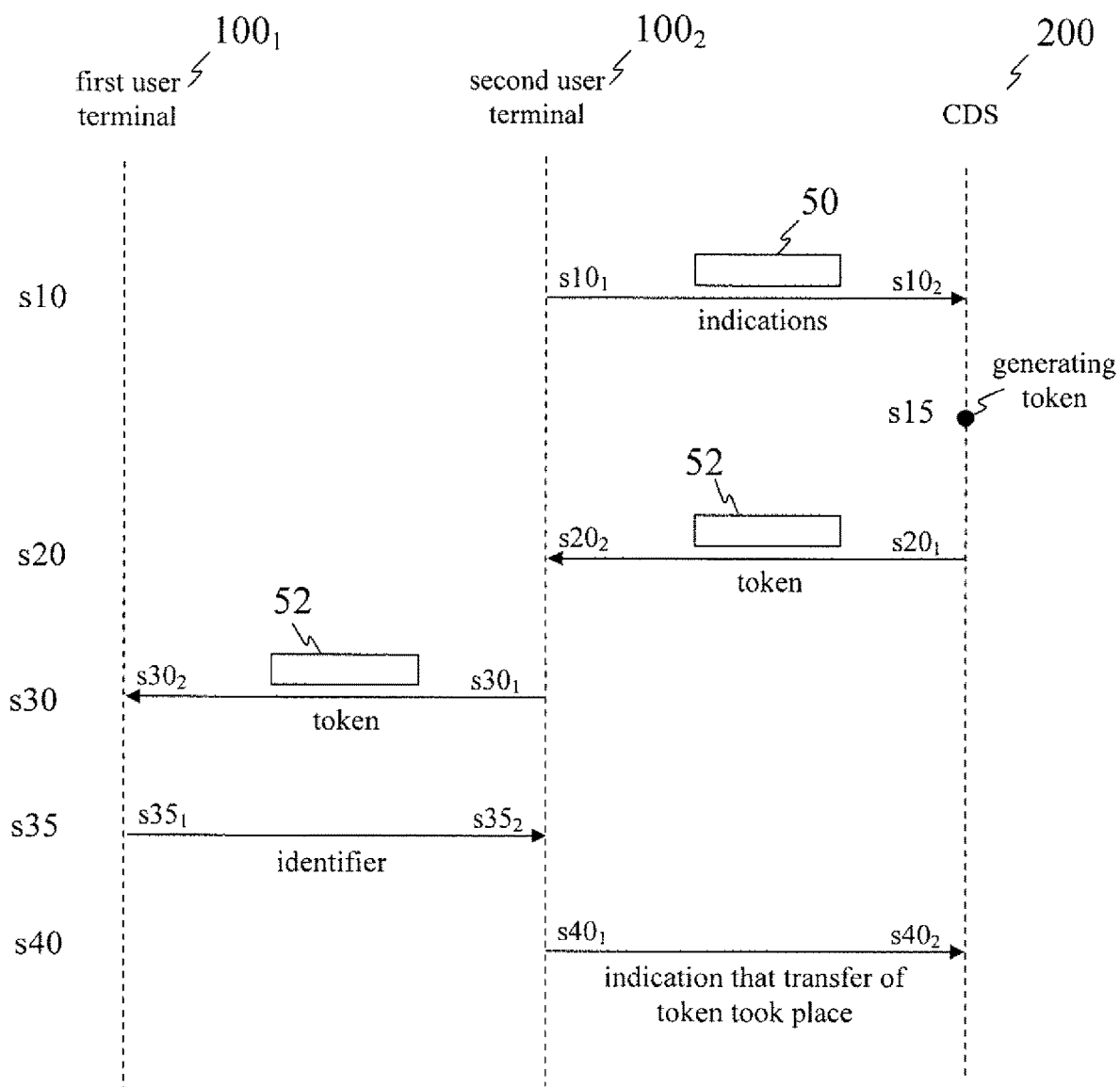
FIG. 4 is a message sequence chart of a method in another embodiment of the invention, which differs from FIG. 3 in that, after the second user terminal receives the first user terminal's identifier, the second user terminal indicates to the CDS that the transfer of token took place.

FIG. 4 is a message sequence chart of a method in another embodiment of the invention, which differs from FIG. 3 as follows. After second user terminal $100_2$ receives the first user terminal's $100_1$ identifier, second user terminal $100_2$ indicates s40 to CDS 200 that token 52 was transferred. In one embodiment, this comprises sending token 52 to CDS 200 (for ease of identification of the sponsorship at stake). In another embodiment, this comprises sending the first user terminal's $100_1$ identifier(s) to CDS 200 (for ease of identification of the first user terminal $100_1$ to which the sponsorship is directed). In yet another embodiment, this comprises sending both token 52 and the first user terminal's $100_1$ identifier(s) to CDS 200 (thus combining the two above-mentioned advantages).

Figure 5:
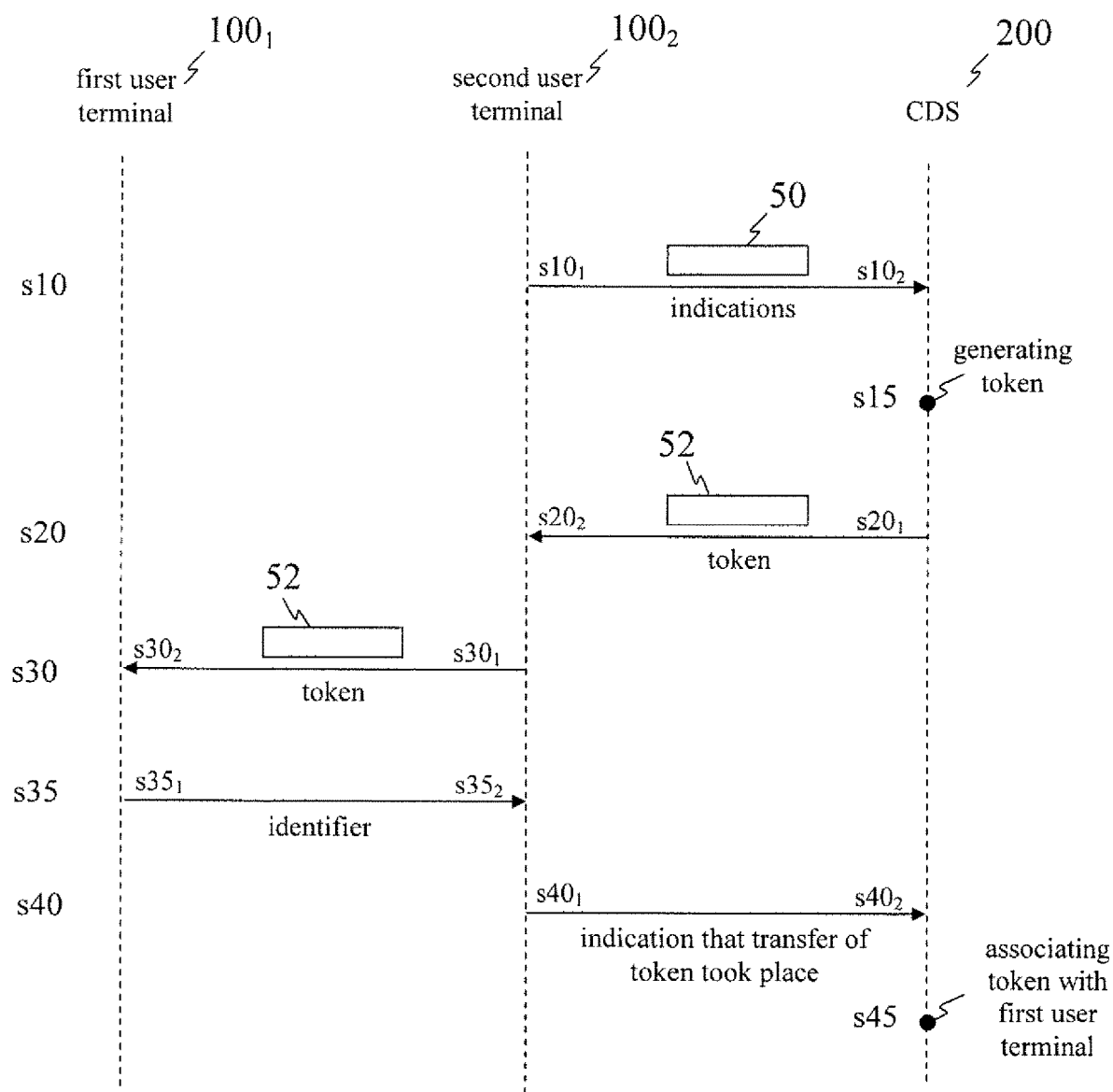
FIG. 5 is a message sequence chart of a method in another embodiment of the invention, which differs from FIG. 4 in that, after the CDS receives an indication that the transfer of token took place, the CDS associates the token with the first user terminal.

FIG. 5 is a message sequence chart of a method in another embodiment of the invention, which differs from FIG. 4 as follows. After CDS 200 receives $s40_2$ an indication that the token was transferred, and after also receiving, at that time, both token 52 and the first user terminal's $100_1$ identifier(s), CDS 200 associates s45 the token 52 with the first user terminal's $100_1$ identifier(s). The association may for example be stored in an internal or external database.

Figure 6:
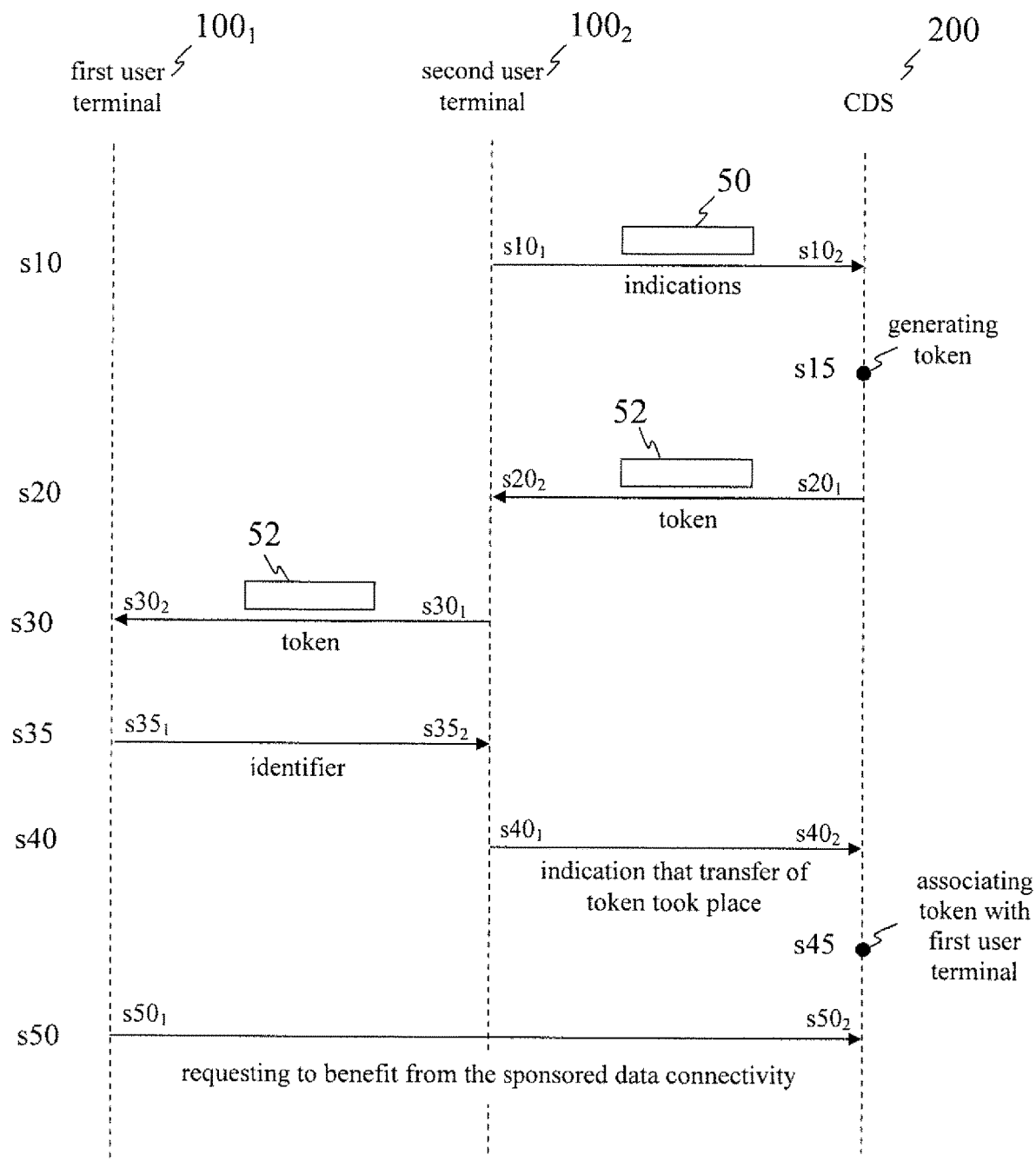
FIG. 6 is a message sequence chart of a method in another embodiment of the invention, which differs from FIG. 5 in that the first user terminal further requests to benefit from the sponsored data connectivity.

FIG. 6 is a message sequence chart of a method in another embodiment of the invention, which differs from FIG. 5 as follows. The first user terminal $100_1$ further requests s50 to benefit from the sponsored data connectivity. The request may comprise token 52 and the first user terminal's $100_1$ identifier.

Figure 7:
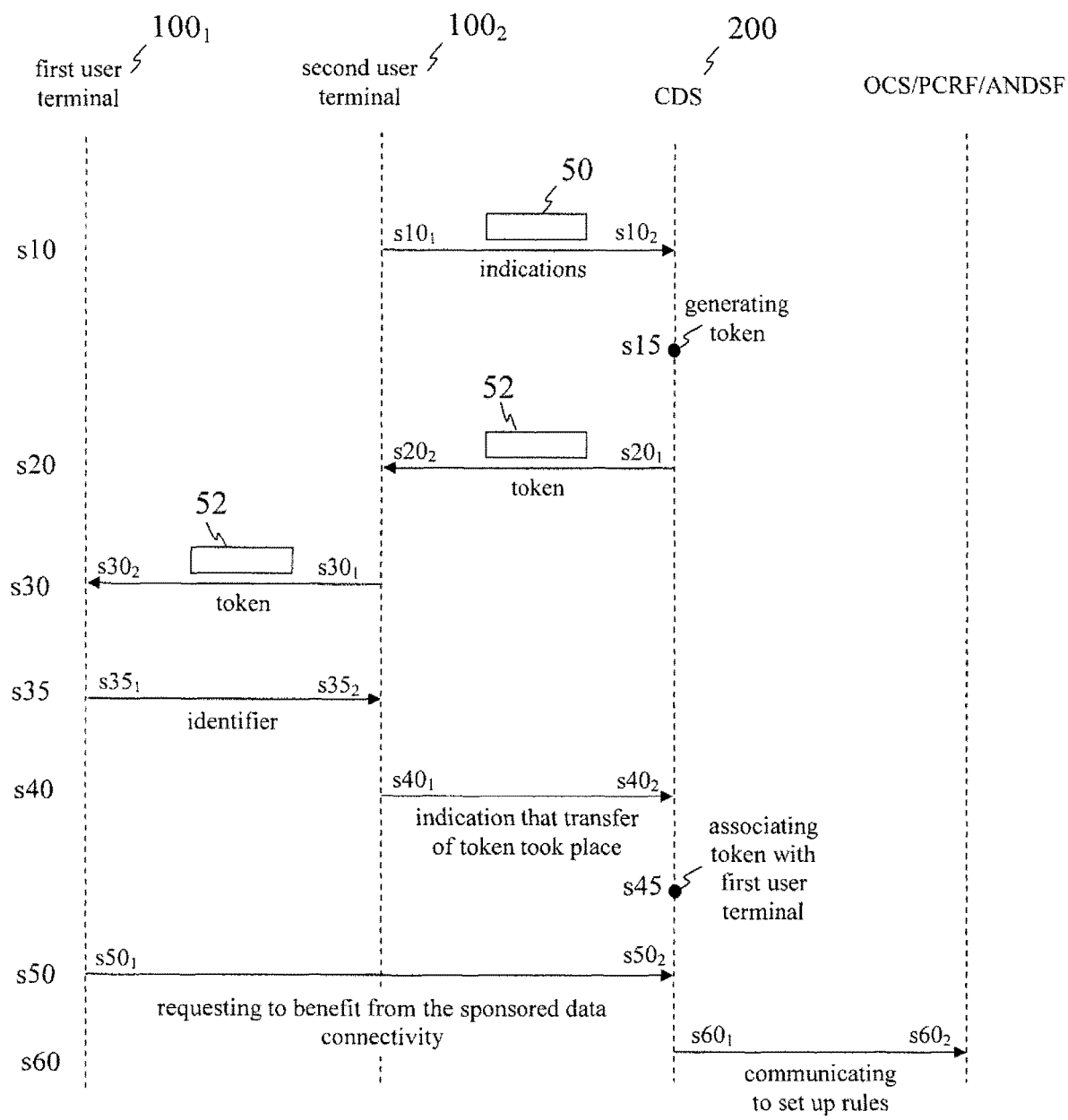
FIG. 7 is a message sequence chart of a method in another embodiment of the invention, which differs from FIG. 6 in that the CDS communicates with at least one of an Online Charging System (OCS), a Policy and Charging Rules Function (PCRF) and an Access Network Discovery and Selection Function (ANDSF) to set up rules.

FIG. 7 is a message sequence chart of a method in another embodiment of the invention, which differs from FIG. 6 as follows. CDS 200 communicates with at least one of an OCS, a PCRF and an ANDSF to set up rules in the telecommunication network so that first user terminal $100_1$ can benefit from the sponsored data connectivity associated with the token 52. In particular, the rules are set up in such a manner that the above-discussed restrictions associated with the sponsoring are duly taken into account. First user terminal 100₁ may then connect to an access network to benefit from the sponsored data connectivity (not illustrated).

In one embodiment, there is an ANDSF in the network. In such case, the ANDSF receives instructions from CDS 200, and the ANDSF creates new access network policy rules for both the first and second user terminal 100₁, 100₂. In relation to the first user terminal 100₁, these policy rules indicate which access networks (cellular, roaming networks, WLAN with SSIDs) the first user terminal 100₁ can connect to enjoy the sponsored connectivity. In relation to the second user terminal 100₂, since its quota has been decreased to account for the sponsoring, it may be that the second user terminal 100₂ no longer has sufficient quota to connect to certain WLANs. Thus, the ANDSF may need to remove access to previously authorized WLANs.

Thus, in one embodiment, new access network policy rules are sent to the second user terminal 100₂. Indeed, the second user terminal 100₂ settings may need to be updated with new PCRF rules that, for example, reduce its current QoS settings (e.g., bandwidth), due to the reduction in quota corresponding to the sponsoring.

If there is an ANDSF, the ANDSF client in the user terminals controls and prevents the user terminals from connecting to non-authorized access networks.

In one embodiment, there is no ANDSF in the network. However, the first user terminal 100₁ receives an indication (such as for example an SMS or some other human readable message) informing the user about the sponsored data connectivity. The indication may contain a description of the connectivity details, including the applicable restriction(s). In such a manner, the first user terminal 100₁ is aware of the restrictions on the sponsored connectivity. If the first user terminal 100₁ nevertheless attempts to connect to an unauthorized access network, the first user terminal 100₁ will be rejected by the network, or at least the sponsored data connectivity will not be available in such a situation.

Now, to further understand the advantages of the invention, the context in which some embodiments of the invention have been developed and may be put into practice will be explained in more detail, followed by the description of further embodiments.

The ANDSF functionality has been discussed above in the "Background" section. The ANDSF policies are generally sorted by priority. Each policy contains one or more access networks (also sorted by priority) to which a user terminal should attempt to connect at a given point in time.

Operators are deploying WLANs of their own, which are controlled by the operator. Additionally, operators have "roaming agreements" with existing WLAN third-party access service providers. This may be the case at public places, such as cafes, restaurants, shopping malls, airports, etc. The operator's goal is to guarantee that users are always best connected.

The PCRF is a policy controller standardized by 3GPP. The PCRF encompasses policy control decision and flow-based charging control functionalities. The PCRF provides network control rules regarding the service data flow detection, gating, QoS and flow-based charging (except credit management) to be enforced by the policy and charging enforcement function (PCEF). Typically, the PCRF is hosted on a dedicated node (i.e. a PCRF node), whereas the PCEF is co-located within a node routing data packets to/from a UE, such as a gateway GPRS support node (GGSN) or a packet data network gateway (PDN-GW). The PCRF can also provide policy rules to a traffic detection function (TDF), regarding gating, redirection, bandwidth limitation, and charging. The TDF can provide to the PCRF with application detection reporting (start and stop of services) and their corresponding service data flows.

The OCS is a standardized subsystem in 3GPP networks that enables operators to charge their customers, in real time, based on service usage. Most subscription plans that include some sort of quota for mobile broadband connectivity are controlled by the OCS of a 3GPP network. To do so, the OCS implements the Sy interface towards the PCRF, the Gy interface towards the PCEF, and the Gyn interface towards the TDF. An OCS is for example described in 3GPP TS 32.240 V12.4.1 (2014-06), "3rd Generation Partnership Project; Technical Specification Group Services and System Aspects; Telecommunication management; Charging management; Charging architecture and principles (Release 12)". An Sy interface is for example described in 3GPP TS 29.219 V12.2.0 (2014-06), "3rd Generation Partnership Project; Technical Specification Group Core Network and Terminals; Policy and Charging Control: Spending Limit Reporting over Sy reference point (Release 12)".

Figure 8:
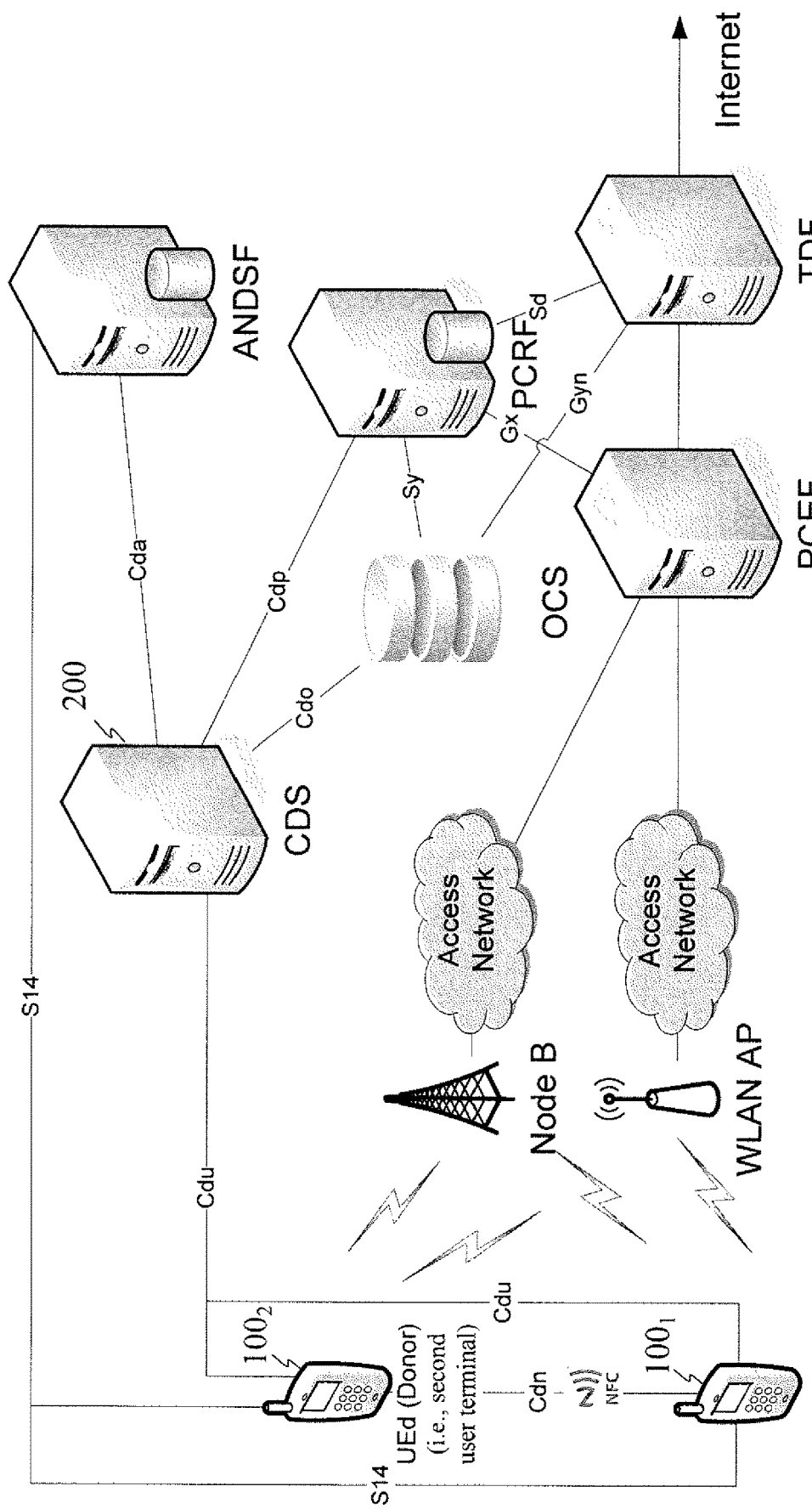
FIG. 8 schematically illustrates a system in one embodiment of the invention.
Figure 9A:
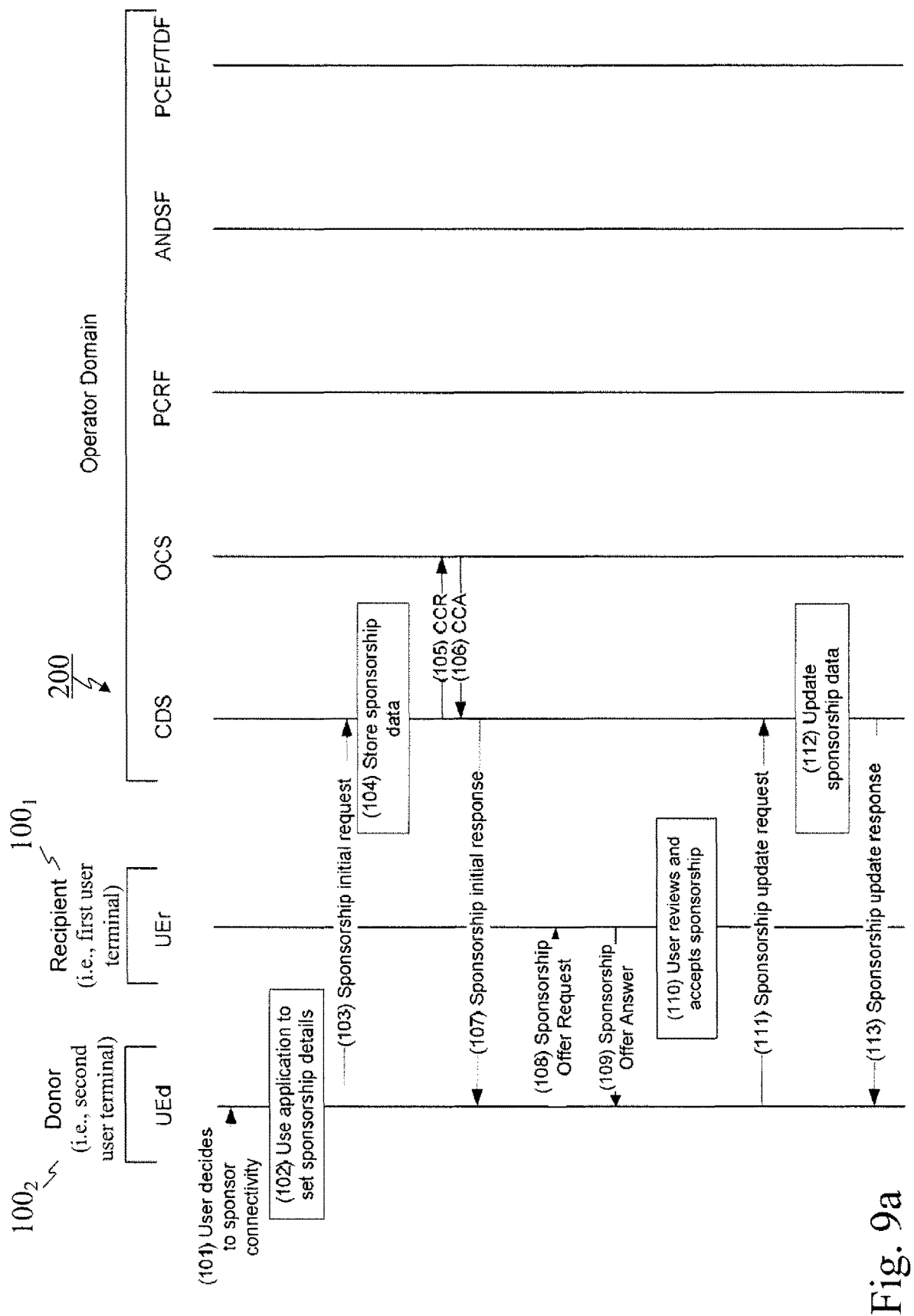
FIGS. 9a to 9d together form a message sequence chart of a method in one embodiment of the invention.
Figure 9B:
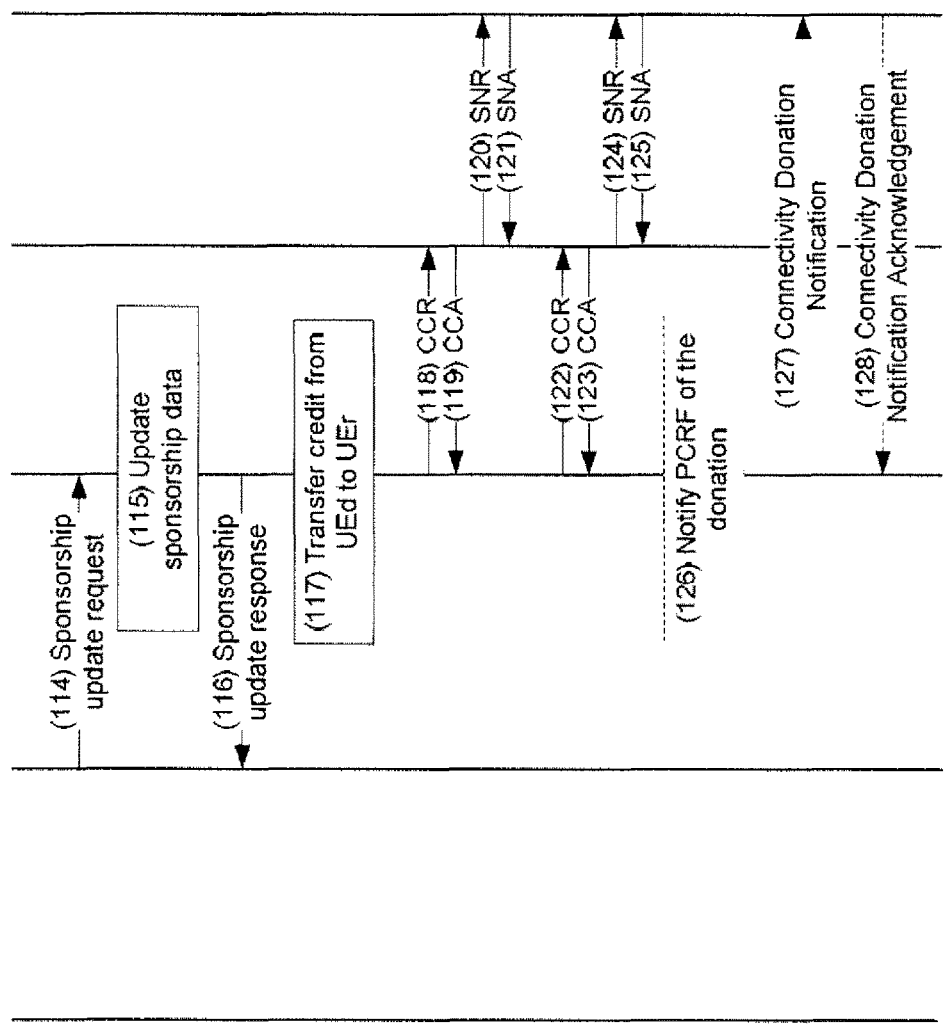
Figure 9C:
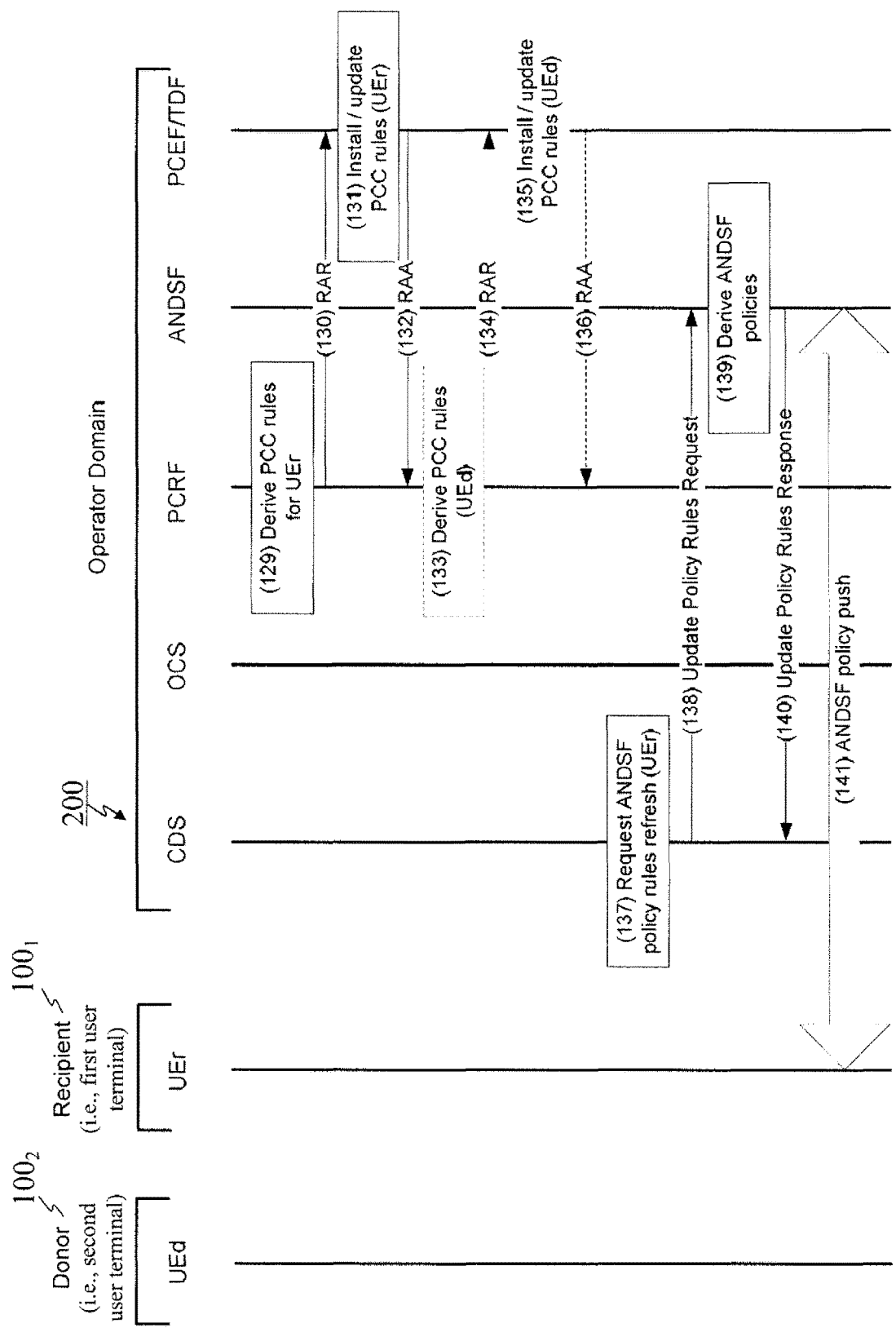
Figure 9D:
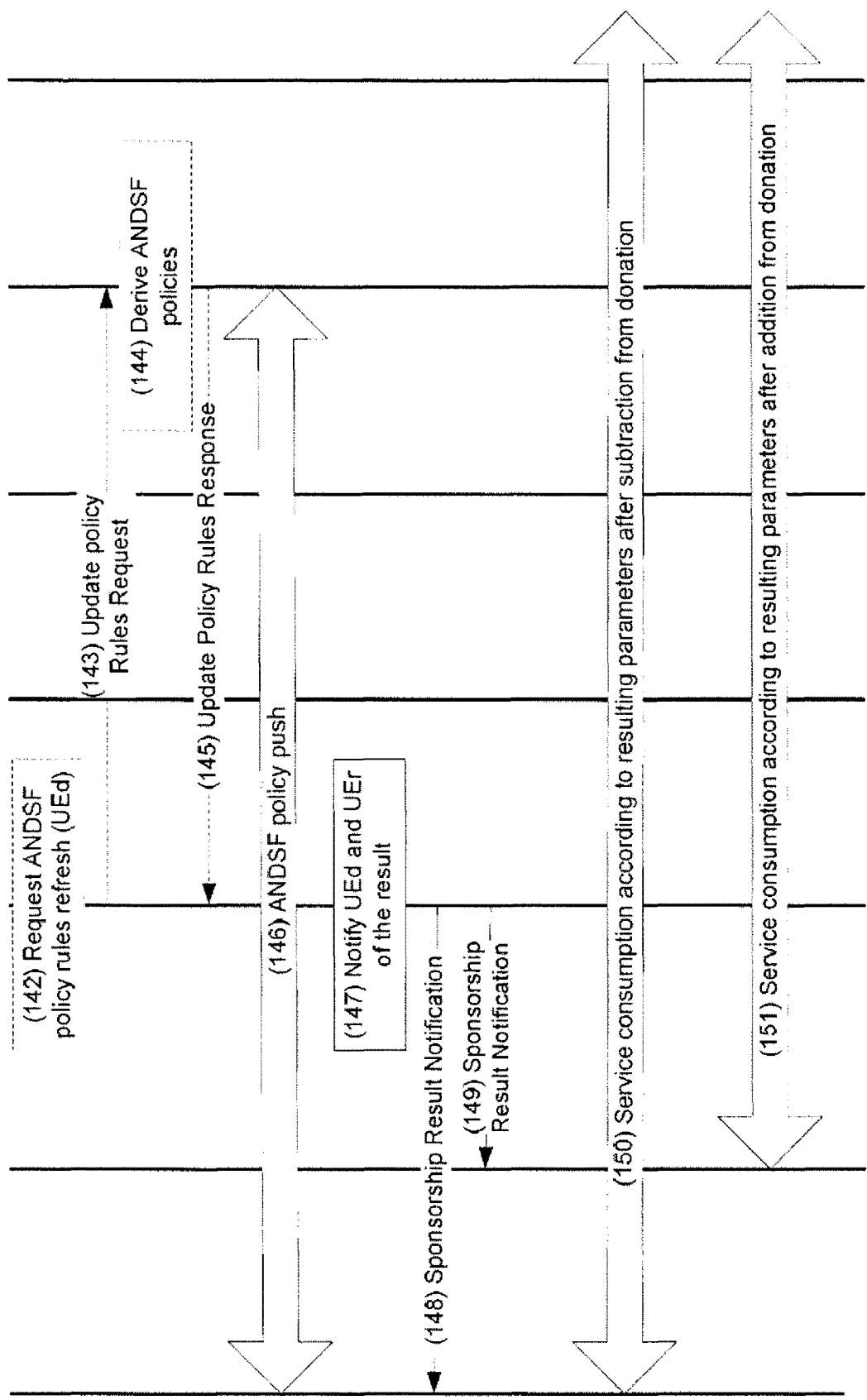

Reference [1] discloses features of a telecommunications network comprising functional entities making up a policy and charging control (PCC) architecture, which comprise, among other the PCRF, PCEF, TDF, and OCS, as well as some of the interfaces referred to below (e.g. see subclause 5.1 and FIG. 5.1-1 in reference [1]). FIG. 8 schematically illustrates some of these functional entities and interfaces.

Let us now discuss some of the problems addressed by embodiments of the invention, for further understanding the context in which some embodiments of the invention have been developed.

Some embodiments of the invention seek to provide a user-friendly solution that allows users to donate some connectivity to other users, where the donor (second user terminal) can decide the location(s) and/or access network(s) where the sponsored data connectivity can be consumed. For example, a parent may wish to donate a quota of one gigabyte of connectivity to his/her child to be used in a given area (e.g., a country) and when connected through a cellular network. This gigabyte of connectivity is deducted from the parent's quota, and made available by the network to the child.

Let us assume that two users, a "donor" and "recipient", know each other, such as for example relatives, friends, or colleagues. The donor has a mobile broadband connectivity plan that includes a given monthly quota of data transfer, for example, 5 gigabytes per month. The recipient either has no mobile broadband connectivity plan, or has one but its monthly quota has expired, or is about to expire. It is desirable that, upon agreement between both users, the donor can donate a part of his monthly connectivity quota to the recipient. For example, the donor may wish to donate an additional gigabyte of data to the recipient to be used in their country or residence (in order to avoid roaming fees), and/or using a cheap WLAN identified by its SSID. This additional gigabyte of data will be deducted from the donor's available quota and added for immediate usage to the recipient, so that the recipient can start using this additional quota for e.g. Internet connectivity from his terminal, once the recipient claims it.

When donating the data connectivity, the donor may wish to limit the usage of the sponsored connectivity to a certain location of the recipient, and using certain access networks (SSIDs of WLANs, or cellular networks).

To the best of the inventors' knowledge, no technical solution is known in the art to address these needs in a user-friendly manner.

Let us now discuss further embodiments of the invention.

Some embodiments of the invention solve the above-described problems by using a combination of technologies. NFC technology is used to ease the process by which the donor (i.e., the second user terminal $100_2$) shares an invitation for a sponsoring of data connectivity with the recipient (i.e., the first user terminal $100_1$). In order to transfer this invitation from the donor $100_2$ to the recipient $100_1$, the two user terminals $100_1$, $100_2$ are approached from one another, such as for example placed back to back, so that their NFC internal chips are in close proximity.

FIG. 8 schematically illustrates two user terminals, labelled as "UEd" (used by the donor), i.e. the second user terminal $100_2$, and "UEr" (used by the recipient), i.e. the first user terminal $100_1$, in one embodiment of the invention. These devices $100_1$, $100_2$ have network connectivity, via for example cellular network, WLAN, or both. It is assumed that the donor $100_2$ has an excess of connectivity, and wishes to donate a portion thereof to the recipient $100_1$. It is assumed that recipient $100_1$ has at least connectivity to the packet core network of the operator and the nodes located therein, but there is no need for recipient $100_1$ to have connectivity to the Internet. It is further assumed that both donor $100_2$ and recipient $100_1$ are subscribers of the same network operator.

First, donor $100_2$ selects the parameters governing the sponsored data connectivity. This may include selecting the amount of bandwidth to be sponsored, and the location(s) and access network(s) in which such bandwidth can be used by recipient $100_1$. Donor $100_2$ may also select other parameters such as for example the list of services or web sites that can be reached using this sponsored data connectivity. Thereafter, donor $100_2$ contacts a server in the network, namely CDS 200, which is part of the packet core network of the mobile operator (this step corresponds to step s10 of FIG. 1). In particular, donor $100_2$ transmits the parameters of the sponsored data connectivity, along with the donor's own IMSI (or any other identifier). The Cdu interface is used for the communication between any user terminals $100_1$, $100_2$ and CDS 200.

CDS 200 may then initiate a first contact with the OCS in order to verify that donor $100_2$ has enough available quota for the sponsoring to be authorized. If OCS replies satisfactorily, CDS 200 sends a positive response back to donor's user terminal $100_2$, along with a transaction identification, i.e. a token 52 (this step corresponds to step s20 of FIG. 1). Otherwise, CDS 200 sends a negative response back to the donor's user terminal $100_2$ indicating the lack of quota for the sponsoring.

Thereafter, the donor may approach his user terminal $100_2$ to the recipient's user terminal $100_1$ in order to exchange information via NFC technology (a QR code can also be used, as explained above). In particular, donor $100_2$ sends to recipient $100_1$ an invitation describing the parameters of the sponsored data connectivity along with the donor's IMSI (or any other identifier) (this step corresponds to step s30 of FIG. 1). The NFC interface between the two devices is referred to as the Cdn interface in FIG. 8. An application, herewith referred to as donation application, may run on both the second user terminal $100_2$ and first user terminal $100_1$ (a client application). This donation application may be installed in each of the devices and is responsible for the exchange of data between the two UEs. Recipient $100_1$ may send back its own IMSI (or any other identifier) to the donor $100_2$ (this step corresponds to step s35 of FIG. 3).

Thereafter, donor $100_2$ contacts again CDS 200 to transfer the recipient's IMSI together with the transaction identifier, i.e. the token 52 (this step corresponds to step s40 of FIG. 4). The CDS 200 stores these pieces of data for future use (this step corresponds to step s45 of FIG. 5).

At any time after the information exchange between the two UEs, recipient $100_1$ may contact CDS 200 in order to make use of the sponsored data connectivity (this step corresponds to step s50 of FIG. 6). When doing so, recipient $100_1$ sends the donor's IMSI, its own IMSI, and the transaction identifier, i.e. the token 52. CDS 200 verifies the data, and authorizes the connectivity according to the sponsored data connectivity. CDS 200 may then initiate a series of actions (this step corresponds to step s60 of FIG. 7), including:

a) Contacting again the OCS via a newly defined interface, Cdo, for requesting the transfer of connectivity quota from the donor $100_2$ to the recipient $100_1$.
b) Receiving a response from OCS. If the response is positive, carrying on the process; otherwise, informing both users that the sponsoring failed.
c) Contacting the PCRF via a newly defined interface, Cdp, for requesting the allocation of additional bandwidth to the recipient $100_1$ and the subtraction of a corresponding amount from the donor $100_2$. Additionally, CDS 200 may also send to the PCRF the restriction(s) (for example, whether roaming cellular networks can be used), and/or firewall policy rules.
d) Contacting the ANDSF via a newly defined interface, Cda, for sending the access network and locations (e.g., cells or roaming conditions) of the sponsoring. This is used by the ANDSF to create new access network policy rules to each of the recipient $100_1$ and donor $100_2$. Due to their change in allocations, it may be that the access network rules for each of the involved user terminals have changed, for example, the donor $100_2$ may only be allowed now to connect through a given WLAN, identified by an SSID, but not through a cellular access network. Therefore, the ANDSF may need to push new access network policy rules to both donor $100_2$ and recipient $100_1$.

The PCRF, upon reception of the indication from CDS 200, may perform a series of actions, including:

a) Generating new policy rules for both user terminals. These policy rules may have different QoS parameters (bandwidth allocations), charging rules, location rules, and firewall rules, due to the change of connectivity associated to each user.
b) Pushing the new policy rules to the relevant nodes, such as a PCEF via the Gx interface, a BBERF through the Gxx interface (not depicted in FIG. 8), a TDF via the Sd interface or an application function through the Rx interface (not depicted in FIG. 8).

The ANDSF, upon reception of the indication from CDS 200, may also perform a series of actions, including:

a) Generating new access network policy rules to both the second user terminal $100_2$ and the first user terminal $100_1$. These access network rules consider the location of the UE as well as the access network(s) to be used. Due to their change in allocations, it may be that the access network rules for each of the involved UEs have changed, for example, the second user terminal $100_2$ might now only be allowed to connect through WLAN but not through cellular access network.

b) Pushing these newly generated policy rules to each of the involved UEs over the S14 interface.

Finally, CDS 200, upon receiving positive responses from each of the involved servers, may contact each of the users in order to inform them of the results of the sponsoring operation.

In one embodiment, the communication between the user terminals 100₁, 100₂ and the CDS 200 is implemented over the S14 interface. This implies that the application in the user terminals is effectively an enhanced version of an ANDSF client; the CDS 200 is effectively an enhanced version of the ANDSF; the Cdu interface between the UE and CDS is effectively an enhanced version of the S14 interface; and the Cda interface is not present or is internal to the enhanced ANDSF.

In another embodiment, the CDS 200 is collocated with a PCRF. The Cdo interface already described between the CDS and the OCS may thus be effectively implemented as an enhanced version of the Sy interface.

FIGS. 9a to 9d together provide a message sequence chart for an embodiment of the invention. The steps may be described as follows.

Step 101: A second user terminal 100₂ (donor) decides to donate some of its connectivity to a first user terminal 100₁ (recipient). In other words, second user terminal 100₂ decides to sponsor the data connectivity of first user terminal 100₁.

Step 102: The second user terminal's 100₂ user makes use of the donation application installed in the second user terminal 100₂ to define the parameters of the sponsoring. The parameters may include, among others, the amount of bandwidth to be donated, the location(s) and access network (s) in which such bandwidth can be used, and other details such as the list of services or web sites that can be reached with the sponsored data connectivity.

Step 103: Second user terminal 100₂ sends a so-called sponsorship initial request to CDS 200 indicating the parameters, together with one or more identifiers of the subscriber acting as donor, such as for example the donor's IMSI. This step corresponds to step s10 illustrated in FIG. 1.

Step 104: CDS 200 stores the received information. It also calculates the amount corresponding to the sponsoring, in charging units.

Step 105: CDS 200 sends a Credit-Control-Request (CCR) message to the OCS in order to check whether second user terminal 100₂ has enough credit for the sponsoring, and if so, reserve the charging units.

Step 106: The OCS returns, to CDS 200, a Credit-Control-Answer (CCA) message acknowledging the reservation.

Step 107: CDS 200 answers with a so-called sponsorship initial response message to second user terminal 100₂, including a transaction identification, i.e. a token 52. This step corresponds to step s20 illustrated in FIG. 1.

Step 108: The second user terminal's 100₂ user approaches its user terminal from the first user terminal 100₁. Second user terminal 100₂ then transfers, using proximity-based communication means, the sponsorship parameters, including the transaction identifier, i.e. the token 52, to first user terminal 100₁. This step corresponds to step s30 illustrated in FIG. 1.

Step 109: First user terminal 100₁ sends a response to second user terminal 100₂, optionally including one or more identifiers of recipient 100₁, such as for example the recipient's 100₁ IMSI. This step corresponds to step s35 illustrated in FIG. 3.

Step 110: The donation application on first user terminal 100₁ analyses the sponsorship parameters, and may display those to the user, so that the user can review and accept them.

Step 111: Second user terminal 100₂ sends a so-called sponsorship update request to CDS 200 including the recipient's identifier(s) received from first user terminal 100₁ and the transaction identifier, i.e. the token 52. This step corresponds to step s40 illustrated in FIG. 4.

Step 112: CDS 200 updates the sponsorship data associated to the session to include the received recipient's identifier(s). This allows the CDS 200 to know of the identity of the recipient when, later in time, the recipient wishes to make use of the sponsoring (see step 114). This step corresponds to step s45 illustrated in FIG. 5.

Step 113: CDS 200 sends a so-called sponsorship update response to second user terminal 100₂ acknowledging the request.

Step 114: Later in time, first user terminal 100₁ sends a sponsorship update request to CDS 200 indicating the acceptance of the sponsoring. The request includes the transaction identifier, i.e. the token 52, and the recipient identity, among other data. This step corresponds to step s50 illustrated in FIG. 6.

Step 115: CDS 200 validates the transaction identifier, i.e. the token, verifies that the recipient identity is authorized to receive the sponsoring, and updates the sponsorship data with the information provided by first user terminal 100₁.

Step 116: CDS 200 sends a sponsorship update response to first user terminal 100₁ acknowledging the request.

Step 117: CDS 200 prepares to transfer credit from the donor to the recipient corresponding to the sponsoring parameters. This implies calculating the amounts of units to be deducted and incremented for the donor and recipient, respectively.

Step 118: CDS 200 sends a Credit-Control-Request (CCR) message to the OCS, instructing the OCS to decrease the credit available for the donor by the amount calculated in step 104. This step corresponds, in part, to step s60 illustrated in FIG. 7.

Step 119: OCS acknowledges the message by sending a Credit-Control-Answer (CCA) message back to CDS 200.

Step 120: If configured to do so, the OCS sends a Spending-Status-Notification-Request (SNR) message to the PCRF indicating the new credit available to the donor.

Step 121: The PCRF acknowledges the message by sending a Spending-Status-Notification-Answer (SNA) to the OCS.

Step 122: CDS 200 sends a Credit-Control-Request (CCR) message to the OCS, instructing the OCS to increase the credit for the recipient by the amount calculated in step 104.

Step 123: OCS acknowledges the message by sending a Credit-Control-Answer (CCA) message back to CDS 200.

Step 124: If configured to do so, the OCS sends a SNR message to the PCRF indicating the new credit available for the recipient.

Step 125: The PCRF acknowledges the message by sending a SNA to the OCS.

Step 126: Optionally, CDS 200 may notify the PCRF of the sponsoring taking place. The PCRF may have received the information in steps 119 and 123. In such case, the notification from CDS 200 may contain extra information, such as the restriction rules, which may be used to refine the policy decision taking place in next steps.

Step 127: CDS 200 sends a connectivity donation notification message to the PCRF, identifying the donor and recipient, and the sponsorship parameters.

Step 128: The PCRF acknowledges the message with a connectivity donation notification acknowledgement message.

Step 129: Based on the information received in steps 120, 124, and optionally 127, the PCRF derives new PCC rules for the recipient.

Step 130: The PCRF sends a Re-Authorization-Request (RAR) message to the PCEF to request installation of the new PCC rules applicable to the recipient.

Step 131: The PCEF installs the new PCC rules applicable to the recipient, and enforces them.

Step 132: The PCEF acknowledges the RAR message (129) for the recipient by sending a Re-Authorization-Answer (RAA) to the PCRF.

Step 133: Based on the information received in steps 120, 124, and optionally 127, the PCRF derives new PCC rules for the donor.

Step 134: The PCRF sends a RAR message to the PCEF to request installation of the new PCC rules applicable to the donor.

Step 135: The PCEF installs the new PCC rules applicable to the donor, and enforces them.

Step 136: The PCEF acknowledges the RAR message for the donor by sending a RAA to the PCRF.

Step 137: CDS 200 determines that new ANDSF policy rules should be sent to the first user terminal $100_1$ in order for first user terminal $100_1$ to select an access network that provides the sponsored data connectivity.

Step 138: CDS 200 sends a so-called update policy rules request message to the ANDSF indicating parameters of the sponsoring, including access network, location information, and roaming details, and the recipient's identity, and instructing the ANDSF to compute new ANDSF policies for first user terminal $100_1$.

Step 139: The ANDSF, based on the sponsoring parameters, derives new access network policy rules for first user terminal $100_1$. The ANDSF may query the SPR, the PCRF or the UDR (not depicted) to retrieve the required user profile information to effectively calculate policy rules.

Step 140: The ANDSF acknowledges the update policy rules request message by sending an update policy rules response message to CDS 200.

Step 141: The ANDSF initiates an ANDSF policy rules push to the first user terminal $100_1$, as per conventional procedures. This typically requires a push SMS message to first user terminal $100_1$, followed by an exchange of requests and responses between first user terminal $100_1$ and the ANDSF, at the end of which the first user terminal $100_1$ is provided with new access network rules that may specify the access network(s) that first user terminal $100_1$ can use.

Step 142: Optionally, CDS 200 determines that new ANDSF policy rules should be sent to second user terminal $100_2$ as well, in order for second user terminal $100_2$ to select an access network that provides the best connectivity taking into account the sponsoring having been just made (which may have led to a decrease in the quota available to second user terminal $100_2$).

Step 143: CDS 200 sends an update policy rules request message to the ANDSF instructing it to compute new ANDSF policies for second user terminal $100_2$. This message includes the sponsoring details as well as the donor's identity.

Step 144: The ANDSF, based on the sponsoring parameters, derives new access network policy rules for second user terminal $100_2$. The ANDSF may query the SPR, the PCRF or the UDR (not depicted) to retrieve the required user profile information to effectively calculate policy rules.

Step 145: The ANDSF acknowledges the update policy rules request message by sending an update policy rules response message to CDS 200.

Step 146: The ANDSF initiates an ANDSF policy rules push to second user terminal $100_2$ as per conventional procedures. This typically requires a push SMS message to second user terminal $100_2$, followed by an exchange of requests and responses between second user terminal $100_2$ and the ANDSF, at the end of which second user terminal $100_2$ is provided with new access network rules that may specify the access network(s) that the second user terminal $100_2$ can use.

Step 147: CDS 200 notifies both user terminals $100_1$, $100_2$ that the sponsorship process has completed successfully.

Step 148: CDS 200 sends a sponsorship result notification to second user terminal $100_2$.

Step 149: CDS 200 sends a sponsorship result notification to first user terminal $100_1$.

Step 150: Upon reception of a successful sponsorship result notification (step 148), second user terminal $100_2$ can still consume the sponsored service, but now according to the new parameters and limits determined by the subtraction of the donation/sponsoring. For example, if extra bandwidth was the sponsored service, the bandwidth consumption limit by second user terminal $100_2$ is reduced by an amount equal to the donated amount.

Step 151: Upon reception of a successful sponsorship result notification (step 149), first user terminal $100_1$ can start or continue the consumption of the donated service according to the new parameters and limits determined by addition of the donation/sponsoring. For example, if extra bandwidth was the donated service, the bandwidth consumption limit by first user terminal $100_1$ is added by an amount equal to the donated amount.

In one embodiment, one or more new interfaces are defined, amongst the following:

Cdn Interface:

The Cdn interface is used for UE-to-UE communication and may be based, for example, on NFC technology. NFC technology enables the exchange of information between NFC-enabled devices provided that the devices are placed close enough. NDEF (NFC Data Exchange Format) messages can be exchanged between two devices, every message comprising one or more NDEF records.

The Cdn interface defines the following NDEF messages, and records:

Sponsorship Offer Request: This message is sent from second user terminal $100_2$ to first user terminal $100_1$ to indicate a sponsorship offer from a donor to a recipient. It contains a NDEF record describing the sponsorship details, including the transaction identifier, i.e. token 52.

Sponsorship Offer Answer: This message is sent from first user terminal $100_1$ to second user terminal $100_2$ as a response to a Sponsorship Offer Request message. It contains a NDEF record with one or more subscriber identifiers for first user terminal $100_1$.

Cdu Interface:

The Cdu interface lies between each of the user terminals $100_1$, $100_2$ and the CDS 200. In one embodiment, the Cdu interface is based on REST. The Cdu interface is secured using TLS.

The interface provides the following operations, mapped to REST messages.

Sponsorship Initial Request: This message is sent from second user terminal 100₂ to CDS 200 to request the CDS 200 to initiate a connectivity donation/sponsoring procedure. The REST message includes a request body containing the sponsorship parameters, including the amount of bandwidth to be donated, the maximum download/upload speed, amount of money to be transferred, periods of time in which the extra bandwidth can be made available to the Recipient, among other data, location area where the extra bandwidth is available, the identity of the donor, and transaction identifiers. The request body may be encoded using JSON or XML, or any other marshalling format.

Sponsorship Initial Response: This message is sent from CDS 200 to second user terminal 100₂ as a response to the Sponsorship Initial Request message. It is carried in the REST response to the Sponsorship Initial Request REST request. If some data is present in the message, such as new transaction identifiers, it includes a response body. The response body may be encoded using JSON or XML, or any other marshalling format.

Sponsorship Update Request: This message is sent from the user terminal to CDS 200 to update the CDS with information pertaining to an ongoing connectivity donation/sponsoring procedure. Both second user terminal 100₂ and first user terminal 100₁ can send this message at any time. The REST message includes a request body containing the sponsorship parameters, the identities of the donor and the recipient, and transaction identifiers. The request body may be encoded using JSON or XML, or any other marshalling format.

Sponsorship Update Response: This message is sent from CDS 200 to the user terminal as a response to the Sponsorship Update Request message. It is carried in the REST response to the Sponsorship Update Request REST request. If some data is present in the message, it includes a response body. The response body may be encoded using JSON or XML, or any other marshalling format.

In another embodiment of the invention, when the CDS 200 is collocated with the ANDSF, the Cdu interface is realized by extending the S14 interface.

A new Management Object (MO) is defined: Sponsorship MO. The OCS is exchanged between second user terminal 100₂ and CDS 200, and first user terminal 100₁ and CDS 200, using conventional S14 pull procedures, effectively providing the Sponsorship Initial Request, Sponsorship Initial Response, Sponsorship Update Request, and Sponsorship Update Response operations.

Figure 10:
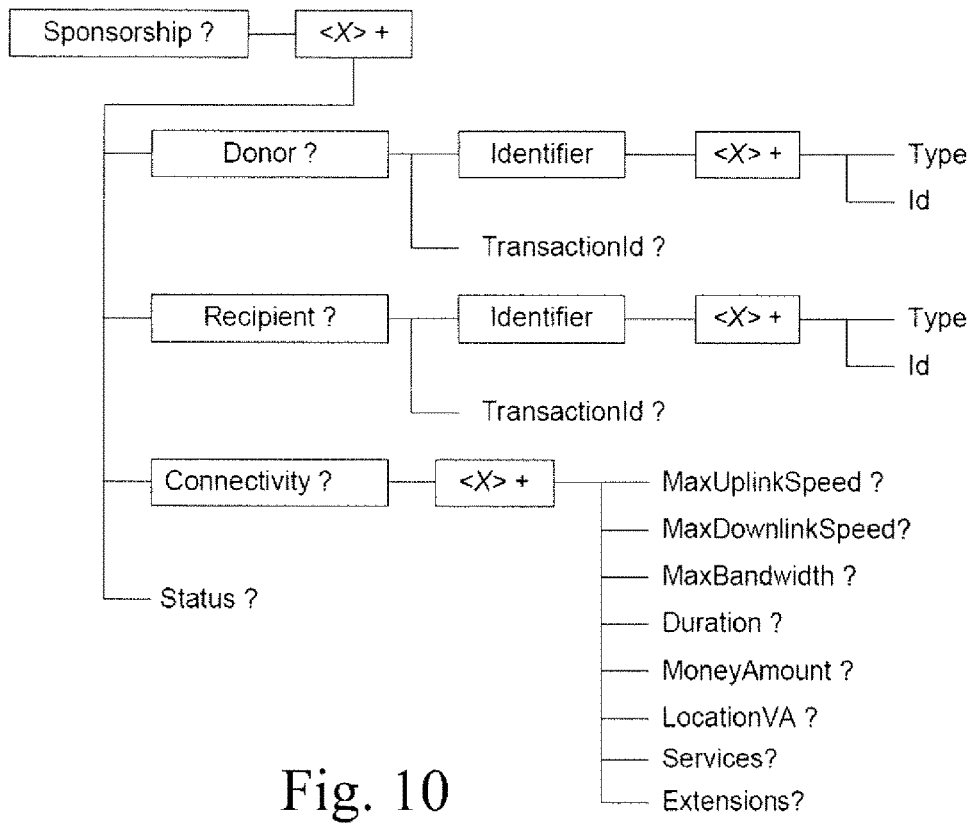
FIG. 10 schematically illustrates a management object (MO) that may be used for exchanging information useful in some embodiments of the invention.

The sponsorship MO may for example have the structure illustrated in FIG. 10. The structure of the MO may be described in more details as follows:

The Sponsorship node acts as a placeholder for one or more Sponsorship information.

The Sponsorship/<X> is an interior node for a single Sponsorship information

The Sponsorship/<X>/Donor node is a placeholder for the Donor information.

The Sponsorship/<X>/Donor/Identifier node is a placeholder for one or more Donor identifiers.

The Sponsorship/<X>/Donor/Identifier/<X> node is an interior node for a single Donor identifier The Sponsorship/<X>/Donor/Identifier/<X>/Type is a leaf node representing the type of identifier, such as MSISDN or IMSI.

The Sponsorship/<X>/Donor/Identifier/<X>/Id is a leaf node representing the identifier, such as the MSISDN number or the IMSI number.

The Sponsorship/<X>/Donor/Transactionid is a leaf node representing the Donor transaction identifier.

The Sponsorship/<X>/Recipient node is a placeholder for the Recipient information.

The Sponsorship/<X>/Recipient/Identifier node is a placeholder for one or more Recipient identifiers.

The Sponsorship/<X>/Recipient/Identifier/<X> node is an interior node for a single Recipient identifier.

The Sponsorship/<X>/Recipient/Identifier/<X>/Type is a leaf node representing the type of identifier, such as MSISDN or IMSI.

The Sponsorship/<X>/Recipient/Identifier/<X>/Id is a leaf node representing the identifier, such as the MSISDN number or the IMSI number.

The Sponsorship/<X>/Recipient/TransactionId is a leaf node representing the Donor transaction identifier.

The Sponsorship/<X>/Connectivity node is a placeholder for one or more Connectivity details (i.e. parameters).

The Sponsorship/<X>/Connectivity/<X> node is an interior node for a single connectivity detail.

The Sponsorship/<X>/Connectivity/<X>/MaxUplinkSpeed is a leaf node representing the allowed maximum uplink speed.

The Sponsorship/<X>/Connectivity/<X>/MaxDownlinkSpeed is a leaf node representing the allowed maximum downlink speed.

The Sponsorship/<X>/Connectivity/<X>/MaxBandwidth is a leaf node representing the allowed maximum bandwidth.

The Sponsorship/<X>/Connectivity/<X>/MaxDuration is a leaf node representing the allowed maximum duration.

The Sponsorship/<X>/Connectivity/<X>/MoneyAmount is a leaf node representing the desired amount of money to be transferred.

The Sponsorship/<X>/Connectivity/<X>/LocationVA is a leaf node representing a location validity area where the donation can be consumed.

The Sponsorship/<X>/Connectivity/<X>/Services is a leaf node representing a set of services that can be accessed with the donation.

The Sponsorship/<X>/Connectivity/<X>/Extension is a leaf node representing any proprietary extensions.

The Sponsorship/<X>/Status is a leaf node representing the current status of the sponsorship process.

Cdo Interface:

The Cdo interface lies between CDS 200 and the OCS. In one embodiment, the Cdo interface is based on Diameter, extending the Ro interface. Other realizations are also possible.

To support the above-described signalling, the Cdo interface extends the Ro interface by adding the following AVPs to the Credit-Control-Request message:

Sponsoring-Transaction-Id: This AVP is used to convey the transaction identifier generated by CDS 200, and is of type UTF8String.

Sponsoring-Donor-Id: This AVP is used to identify the Donor and is of type Grouped. The Sponsoring-Donor-Id AVP includes a Subscription-Id-Data AVP that holds the identifier and a Subscription-Id-Type AVP that defines the identifier type.

Sponsoring-Recipient-Id: This AVP is used to identify the Recipient and is of type Grouped. The Sponsoring-Recipient-Id AVP includes a Subscription-Id-Data AVP that holds the identifier and a Subscription-Id-Type AVP that defines the identifier type.

Sy Interface:

The Sy interface lies between the OCS and the PCRF. In one embodiment, the Sy interface is enhanced by adding the following AVPs to the Spending-Notification-request message:

Sponsoring-Transaction-Id: This AVP is used to convey the transaction identifier generated by CDS 200, and is of type UTF8String.

Sponsoring-Donor-Id: This AVP is used to identify the Donor and is of type Grouped. The Sponsoring-Donor-Id AVP includes a Subscription-Id-Data AVP that holds the identifier and a Subscription-Id-Type AVP that defines the identifier type.

Sponsoring-Recipient-Id: This AVP is used to identify the Recipient and is of type Grouped. The Sponsoring-Recipient-Id AVP includes a Subscription-Id-Data AVP that holds the identifier and a Subscription-Id-Type AVP that defines the identifier type.

Cdp Interface:

The Cdp interface lies between the CDS 200 and the PCRF and its presence is optional.

When present, it is used by CDS 200 to notify the PCRF of the connectivity donation/sponsoring parameters, so that the PCRF can derive new PCC rules for first user terminal 100$_1$, and optionally, second user terminal 100$_2$. If not present, the PCRF shall receive the notification of credit changes from the OCS, through the Sy interface. When both Cdp and Sy interfaces are present, the PCRF may combine the information from both interfaces when deriving PCC rules.

In one embodiment, the interface is based on REST. The Cdp interface is secured using TLS.

The interface provides the following operations, mapped to REST messages:

Connectivity donation notification: This message is sent from CDS 200 to the PCRF to notify the latter that a connectivity donation has been made. The REST message includes a request body containing the sponsorship details, including the identities of the donor and the recipient, and transaction identifiers. The request body may be encoded using JSON or XML, or any other marshalling format.

Connectivity donation notification acknowledgement: This message is sent from the PCRF to CDS 200 as a response to the Connectivity donation notification message. It is carried in the REST response to the Connectivity donation notification REST request. If some data is present in the message, it includes a response body. The response body may be encoded using JSON or XML, or any other marshalling format.

Cda Interface:

The Cda interface lies between CDS 200 and the ANDSF and its presence is optional.

When present, it is used by CDS 200 to request the ANDSF to update the ANDSF policy rules for first user terminal 100$_1$, and optionally, second user terminal 100$_2$. If not present, ANDSF policy rules are not updated from the network and it is up to the user terminal to request an update of the policy rules by any other trigger. In one embodiment, the interface is based on REST. The Cda interface is secured using TLS.

The interface provides the following operations, mapped to REST messages:

Update Policy Rules Request: This message is sent from CDS 200 to the ANDSF to request the ANDSF to derive new ANDSF policy rules for a UE. The REST message includes a request body containing the sponsorship details, including the identities of the Donor or the Recipient. The request body may be encoded using JSON or XML, or any other marshalling format.

Update Policy Rules Response: This message is sent from the ANDSF to CDS 200 as a response to the Update Policy Rules Request message. It is carried in the REST response to the Update Policy Rules Request REST response. If some data is present in the message, it includes a response body. The response body may be encoded using JSON or XML, or any other marshalling format.

Figure 11:
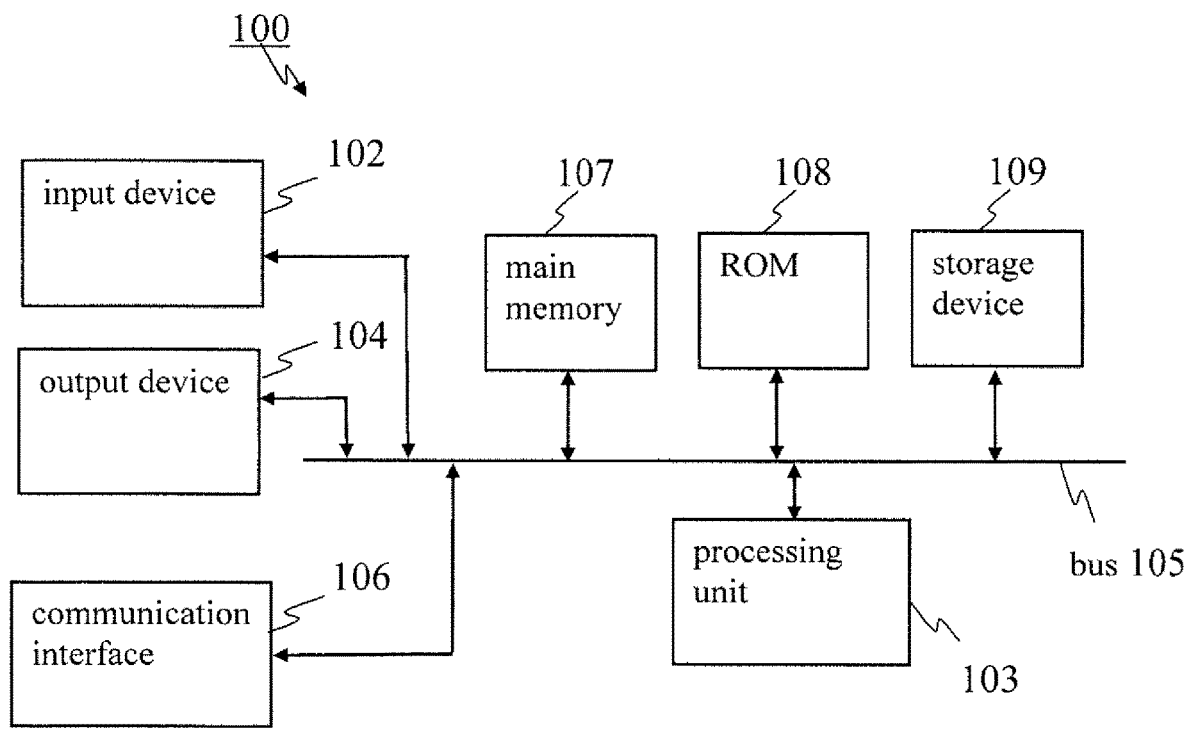
FIG. 11 is a schematic diagram of an exemplary implementation of a user terminal according to one embodiment of the invention.
Figure 14:
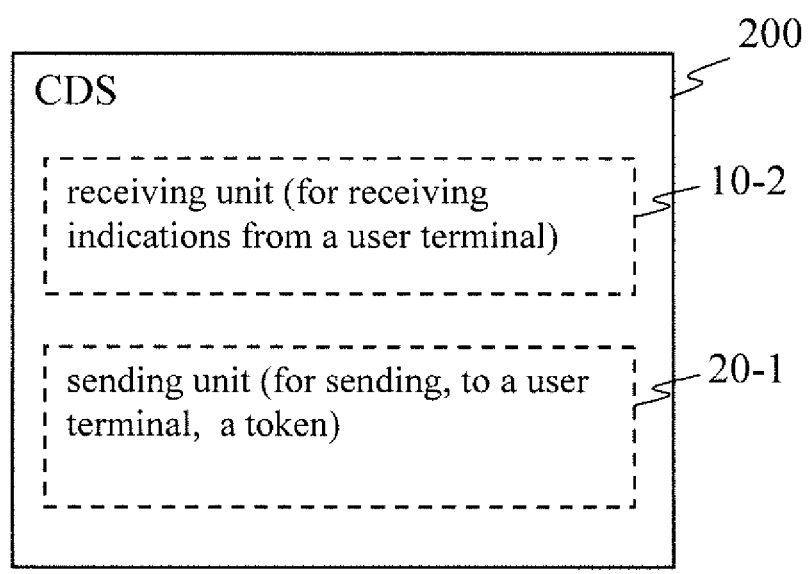
FIG. 14 schematically illustrates a network node acting as CDS, in one embodiment of the invention.

FIG. 11 is a schematic diagram of an exemplary implementation of a user terminal 100 that may be used in embodiments of the invention. As mentioned later, the network node 200 (i.e. as schematically illustrated by FIG. 14) may be implemented using similar elements as those schematically illustrated by FIG. 11.

As illustrated by FIG. 11, a user terminal 100 may include a bus 105, a processing unit 103, a main memory 107, a ROM 108, a storage device 109, an input device 102, an output device 104, and a communication interface 106. Bus 105 may include a path that permits communication among the components of user terminal 100.

Processing unit 103 may include a processor, a microprocessor, or processing logic that may interpret and execute instructions. Main memory 107 may include a RAM or another type of dynamic storage device that may store information and instructions for execution by processing unit 103. ROM 108 may include a ROM device or another type of static storage device that may store static information and instructions for use by processing unit 103. Storage device 109 may include a magnetic and/or optical recording medium and its corresponding drive.

Input device 102 may include a mechanism that permits an operator to input information to user terminal 100, such as a keypad, a keyboard, a mouse, a pen, voice recognition and/or biometric mechanisms, etc. Output device 104 may include a mechanism that outputs information to the operator, including a display, a printer, a speaker, etc. Communication interface 106 may include any transceiver-like mechanism that enables user terminal 100 to communicate with other devices and/or systems (such as with a base station, a WLAN access point, a CDS 200, etc.). For example, communication interface 106 may include mechanisms for communicating with another device or system via a network.

User terminal 100 may perform certain operations or processes described herein. These operations may be performed in response to processing unit 103 executing software instructions contained in a computer-readable medium, such as main memory 107, ROM 108, and/or storage device 109. A computer-readable medium may be defined as a physical or a logical memory device. For example, a logical memory device may include memory space within a single physical memory device or distributed across multiple physical memory devices. Each of main memory 107, ROM 108 and storage device 109 may include computer-readable media. The magnetic and/or optical recording media (e.g., readable CDs or DVDs) of storage device 109 may also include computer-readable media. The software instructions may be read into main memory 107 from another computer-readable medium, such as storage device 109, or from another device via communication interface 106.

The software instructions contained in main memory 109 may cause processing unit 103 to perform operations or processes described herein, such as communicating with a CDS 200. Alternatively, hardwired circuitry may be used in place of or in combination with software instructions to implement processes and/or operations described herein. Thus, implementations described herein are not limited to any specific combination of hardware and software.

Figure 12:
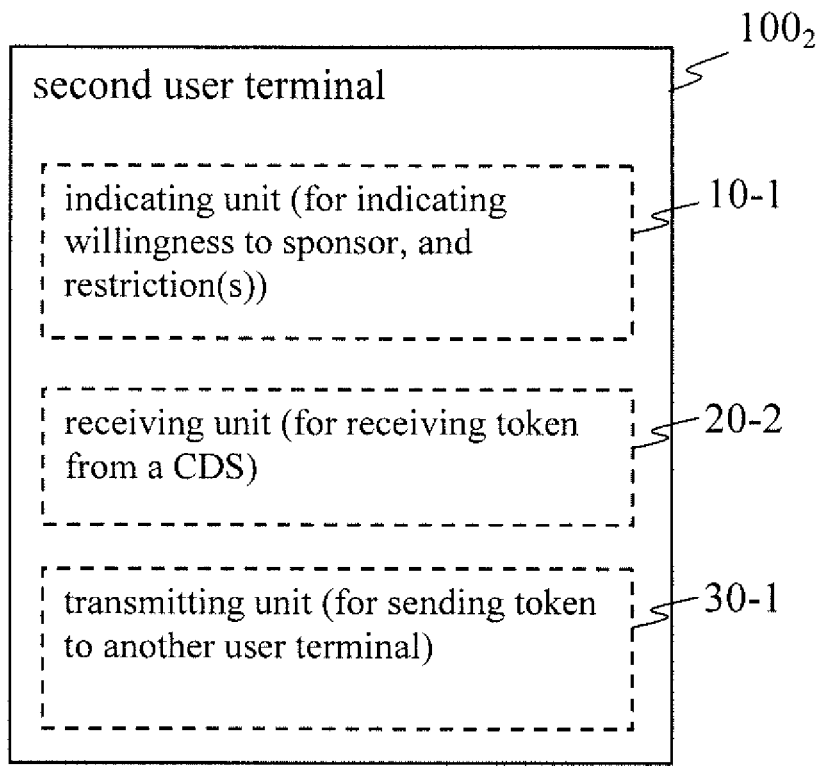
FIG. 12 schematically illustrates a user terminal (referred to as "second user terminal") in one embodiment of the invention.

FIG. 12 schematically illustrates a user terminal $100_2$ in one embodiment of the invention, wherein the user terminal acts as second user terminal $100_2$ for participating in assisting a first user terminal $100_1$ in benefiting from a data connectivity. User terminal $100_2$ illustrated on FIG. 12 may for example be implemented as illustrated on FIG. 11.

User terminal $100_2$ comprises a so-called "indicating unit" 10-1, a so-called "receiving unit" 20-2, and so-called "transmitting unit" 30-1.

Indicating unit 10-1 is configured for indicating to a CDS 200 that the second user terminal $100_2$ is willing to sponsor data connectivity of first user terminal $100_1$ and that at least one restriction is to be imposed on how the sponsored data connectivity can be used by first user terminal $100_1$ The at least one restriction comprises at least one of: (i) where first user terminal $100_1$ is to be located for benefiting from the sponsored data connectivity; and (ii) which access network (s) the first user terminal $100_1$ has to connect to for benefiting from the sponsored data connectivity.

Receiving unit 20-2 is configured for receiving, from CDS 200, a token 52, and transmitting unit 30-1 is configured for transmitting, to first user terminal $100_1$, the token 52, using proximity-based means.

Figure 13:
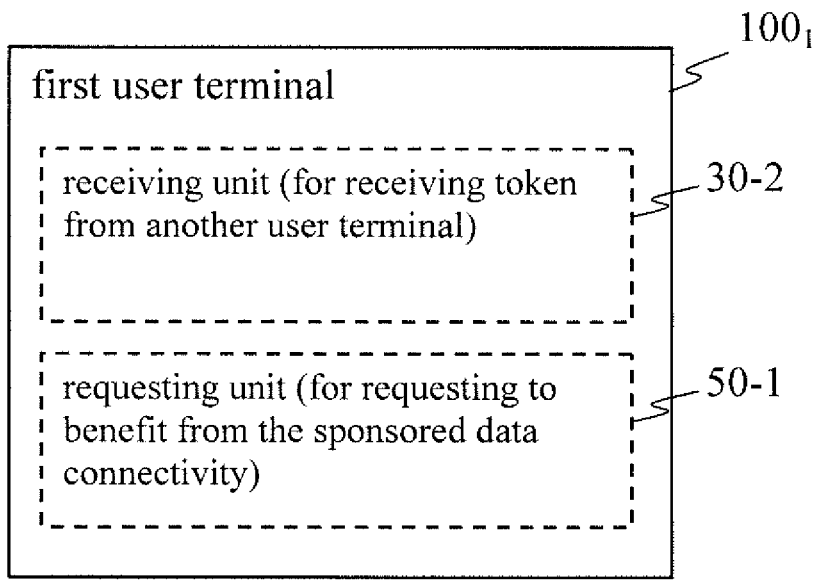
FIG. 13 schematically illustrates a user terminal (referred to as "first user terminal") in one embodiment of the invention.

FIG. 13 schematically illustrates a user terminal $100_1$ in one embodiment of the invention, wherein the user terminal acts as first user terminal $100_1$. User terminal $100_1$ illustrated on FIG. 13 may for example be implemented as illustrated on FIG. 11.

First user terminal $100_1$ comprises a receiving unit 30-2 for receiving a token 52 from another user terminal $100_2$ (second user terminal), so as to inform the first user terminal $100_1$ about a data connectivity sponsoring. In particular, the token 52 identifies the second user terminal's $100_2$ willingness to sponsor data connectivity of the first user terminal $100_1$ considering that at least one restriction is to be imposed on how the sponsored data connectivity can be used by the first user terminal $100_1$. The at least one restriction comprises at least one of: (i) where the first user terminal $100_1$ is to be located for benefiting from the sponsored data connectivity; and (ii) which access network(s) the first user terminal $100_1$ has to connect to for benefiting from the sponsored data connectivity.

First user terminal $100_1$ may also comprise a requesting unit 50-1 for requesting to benefit from the sponsored data connectivity, so that the user may invoke the sponsored connectivity. The request may comprise token 52 and the first user terminal's $100_1$ identifier.

FIG. 14 schematically illustrates a network node in one embodiment of the invention, wherein the network node acts as a CDS 200 for participating in assisting a first user terminal $100_1$ in benefiting from a data connectivity. The network node 200 of FIG. 14 may for example be implemented using similar elements as those illustrated in FIG. 11, wherein—among other apparent changes—the communication interface 106 may be configured to communicate with other network nodes, and wherein the processing unit 103 may execute computer instructions stored in e.g. the main memory unit 107 so that these instructions cause the CDS 200 to behave according to any of the described embodiments.

According to the embodiment illustrated by FIG. 14, network node 200 comprises a so-called "receiving unit" 10-2 and a so-called "transmitting unit" 20-1. Receiving unit 10-2 is configured for receiving an indication, from a second user terminal $100_2$, that the second user terminal $100_2$ is willing to sponsor data connectivity of the first user terminal $100_1$ and that at least one restriction is to be imposed on how the sponsored data connectivity can be used by the first user terminal $100_1$. The at least one restriction comprises at least one of: (i) where the first user terminal $100_1$ is to be located for benefiting from the sponsored data connectivity; and (ii) which access network(s) the first user terminal $100_1$ has to connect to for benefiting from the sponsored data connectivity. Transmitting unit 20-1 is configured for transmitting, to the second user terminal $100_2$, a token 52.

User terminals $100_2$, $100_1$ and network node 200 may be further configured to be able participate in any of the embodiments described elsewhere in the present description.

Where the terms "indicating unit", "receiving unit", "receiving unit", "sending unit", "requesting unit", etc. are used herewith, no restriction is made regarding how distributed these elements may be and regarding how gathered elements may be. That is, the constituent elements of a unit, function or network node may be distributed in different software or hardware components or devices for bringing about the intended function. A plurality of distinct elements may also be gathered for providing the intended functionalities. In particular, the terms "indicating unit", "receiving unit", "receiving unit", "sending unit", "requesting unit", etc., can be considered as equivalent to—respectively—"an indicator", "a receiver", "a sender", "a requester", etc.

Any one of the above-referred units of a network node may be implemented in hardware, software, field-programmable gate array (FPGA), application-specific integrated circuit (ASICs), firmware or the like.

In further embodiments of the invention, any one of the above-mentioned indicating unit, receiving unit, receiving unit, sending unit, requesting unit, etc. is replaced by indicating means, receiving means, receiving means, sending means, requesting means, etc. or indicating module, receiving module, receiving module, sending module, requesting module, etc. respectively, for performing the functions of the indicating unit, receiving unit, receiving unit, sending unit, requesting unit, etc.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

ABBREVIATIONS

3GPP 3rd Generation Partnership Project
ANDSF Access Network Discovery and Selection Function
AP Access point
AS Application server
AVP Attribute-value pair
BBERF Bearer binding and event reporting function
CCA Credit-Control-Answer CCR Credit-Control-Request
CDS Connectivity donation server
EPC Evolved packet core
GGSN Gateway GPRS support node
IEEE Institute of Electrical and Electronics Engineers
IMSI International mobile subscriber identity
IP Internet Protocol
JSON JavaScript Object Notation
LAN Local area network
MO Management object
MSISDN Mobile Subscriber ISDN Number
NDEF NFC data exchange format
NFC Near-field communication
OCS Online charging system
PCC Policy and charging control
PCEF Policy and charging enforcement function
PCRF Policy and charging rules function
PDN-GW Packet data network gateway
QoS Quality of service
QR code Quick Response Code
RAA Re-Authorization-Answer
RAM Random-access memory
RAR Re-Authorization-Request
REST Representational state transfer
RFID Radio-frequency identification
ROM Read-only memory
SNA Spending-Status-Notification-Answer
SNR Spending-Status-Notification-Request
SPR Subscriber Profile Repository
SMS Short Message Service
SSID Service set identifier
TDF Traffic detection function
TLS Transport Layer Security
UDR User data repository
UE User equipment
UICC Universal Integrated Circuit Card
WiMAX Worldwide Interoperability for Microwave Access
WLAN Wireless LAN
WTRU Wireless transmit/receive unit
XML Extensible Markup Language

The invention claimed is:

1. A method carried out in a telecommunication network for assisting a first user terminal in benefiting from a data connectivity, the method comprising:
indicating, by a second user terminal to a connectivity donation server, that the second user terminal is willing to sponsor data connectivity of the first user terminal and that at least one restriction is to be imposed on how the sponsored data connectivity is to be used by the first user terminal, wherein the sponsored data connectivity by the second user terminal, is a part of data connectivity quota of the second user terminal;
transmitting, from the connectivity donation server to the second user terminal, a token; and
transmitting, from the second user terminal to the first user terminal, the token using proximity-based means;
wherein the at least one restriction comprises:
a restriction on a location of the first user terminal for benefiting from the sponsored data connectivity; and
a restriction on an access network or access networks, which the first user terminal has to connect to for benefiting from the sponsored data connectivity.

2. The method of claim 1, wherein the at least one restriction further comprises at least one of:
a restriction on a service or services to be accessed by the first user terminal when the sponsored data connectivity is being used;
a restriction on a maximum quality of service the first user terminal enjoys when benefiting from the sponsored data connectivity,
a restriction on a maximum volume of data the first user terminal enjoys when benefiting from the sponsored data connectivity,
a restriction on a maximum bandwidth the first user terminal enjoys when benefiting from the sponsored data connectivity,
a restriction on a maximum downlink bandwidth the first user terminal enjoys when benefiting from the sponsored data connectivity,
a restriction on a maximum uplink bandwidth the first user terminal enjoys when benefiting from the sponsored data connectivity,
a restriction on a duration during which the first user terminal enjoys the sponsored data connectivity, and
a restriction on a period or periods of time during which the first user terminal enjoys the sponsored data connectivity.

3. The method of claim 1, wherein the proximity-based means comprises at least one of:
near-field communication;
communication by means of a radio-frequency identification tag; and
communication by means of a visual tag.

4. The method of claim 3, wherein the communication by means of the visual tag comprises communication by means of at least one barcode.

5. The method according to claim 1, the method further comprising, after indicating, by the second user terminal to the connectivity donation server, that the second user terminal is willing to sponsor data connectivity of the first user terminal, generating, by the connectivity donation server, the token.

6. The method according to claim 1, the method further comprising, after transmitting the token from the second user terminal to the first user terminal, transmitting, by the first user terminal to the second user terminal, an identifier of the first user terminal.

7. The method of claim 6, wherein the transmitted identifier of the first user terminal comprises at least one of the International Mobile Subscriber Identity (IMSI) of the first user terminal, and the Mobile Subscriber ISDN Number (MSISDN) of the first user terminal.

8. The method according to claim 1, the method further comprising, after transmitting the token from the second user terminal to the first user terminal, indicating, by the second user terminal to the connectivity donation server, that the transfer of token took place.

9. The method of claim 8, wherein indicating, by the second user terminal to the connectivity donation server, that the transfer of token took place comprises transmitting, by the second user terminal to the connectivity donation server, the token.

10. The method of claim 8, wherein indicating, by the second user terminal to the connectivity donation server, that the transfer of token took place comprises transmitting, by the second user terminal to the connectivity donation server, an identifier of the first user terminal.

11. The method of claim 8, wherein indicating, by the second user terminal to the connectivity donation server, that the transfer of token took place comprises:
transmitting, by the second user terminal to the connectivity donation server, the token and an identifier of the first user terminal; and the method further comprising:
associating, by connectivity donation server, the token with the identifier of the first user terminal.

12. The method according to claim 1, the method further comprising, after transmitting the token from the second user terminal to the first user terminal, requesting, by the first user terminal to the connectivity donation server, to benefit from the sponsored data connectivity associated with the token.

13. The method according to claim 1, the method further comprising communicating, by the connectivity donation server, with at least one of:
an online charging system,
a policy and charging rules function, and
an access network discovery and selection function, to set up rules in the telecommunication network so that the first user terminal is able to benefit from the sponsored data connectivity associated with the token.

14. The method according to claim 1, the method further comprising, after transmitting the token from the second user terminal to the first user terminal, connecting, by the first user terminal, to the access network to benefit from the sponsored data connectivity.

15. A method for assisting a first user terminal in benefiting from a data connectivity, the method being carried out by a second user terminal, the method comprising:
indicating, to a connectivity donation server, that the second user terminal is willing to sponsor data connectivity of the first user terminal and that at least one restriction is to be imposed on how the sponsored data connectivity is to be used by the first user terminal, wherein the sponsored data connectivity by the second user terminal, is a part of data connectivity quota of the second user terminal;
receiving, from the connectivity donation server, a token; and
transmitting, to the first user terminal, the token using proximity-based means;
wherein the at least one restriction comprises:
a restriction on a location of the first user terminal for benefiting from the sponsored data connectivity; and
a restriction on an access network or access networks, which the first user terminal has to connect to for benefiting from the sponsored data connectivity.

16. A computer program comprising computer-readable instructions stored in a non-transitory computer readable medium and configured, when executed on a user terminal, to cause the user terminal to carry out the method of claim 15.

17. A method for assisting a first user terminal in benefiting from a data connectivity, the method being carried out by a connectivity donation server, the method comprising:
receiving an indication, from a second user terminal, that the second user terminal is willing to sponsor data connectivity of the first user terminal and that at least one restriction is to be imposed on how the sponsored data connectivity is to be used by the first user terminal, wherein the sponsored data connectivity by the second user terminal, is a part of data connectivity quota of the second user terminal; and
transmitting, to the second user terminal, a token, wherein the token is further transmitted from the second user terminal to the first user terminal using proximity-based means; and wherein the at least one restriction comprises:

a restriction on a location of the first user terminal for benefiting from the sponsored data connectivity; and
a restriction on an access network or access networks, which the first user terminal has to connect to for benefiting from the sponsored data connectivity.

18. A computer program comprising computer-readable instructions stored in a non-transitory computer readable medium and configured, when executed on a network node, to cause the network node to carry out the method of claim 17.

19. A method carried out by a first user terminal, for benefiting from a data connectivity, the method comprising:
receiving, from a second user terminal, a token using proximity-based means, wherein the token is previously received by the second user terminal from a connectivity donation server; and
identifying, based on the token, the second user terminal's willingness to sponsor data connectivity of the first user terminal considering that at least one restriction is to be imposed on how the sponsored data connectivity is to be used by the first user terminal wherein the sponsored data connectivity by the second user terminal, is a part of data connectivity quota of the second user terminal; and
wherein the at least one restriction comprises:
a restriction on a location of the first user terminal for benefiting from the sponsored data connectivity; and
a restriction on an access network or access networks, which the first user terminal has to connect to for benefiting from the sponsored data connectivity.

20. A computer program comprising computer-readable instructions stored in a non-transitory computer readable medium and configured, when executed on a user terminal, to cause the user terminal to carry out the method of claim 19.

21. A second user terminal for participating in assisting a first user terminal, in benefiting from a data connectivity, the second user terminal comprising:
one or more processors configured for indicating, to a connectivity donation server, that the second user terminal is willing to sponsor data connectivity of the first user terminal and that at least one restriction is to be imposed on how the sponsored data connectivity is to be used by the first user terminal, wherein the sponsored data connectivity by the second user terminal, is a part of data connectivity quota of the second user terminal;
a receiver configured for receiving, from the connectivity donation server, a token; and
a transmitter configured for transmitting, to the first user terminal, the token using proximity-based means;
wherein the at least one restriction comprises:
a restriction on a location of the first user terminal for benefiting from the sponsored data connectivity; and
a restriction on an access network or access networks, which the first user terminal has to connect to for benefiting from the sponsored data connectivity.

22. A connectivity donation server configured for participating in assisting a first user terminal, in benefiting from a data connectivity, the connectivity donation server comprising:
a receiver configured for receiving an indication, from a second user terminal, that the second user terminal is willing to sponsor data connectivity of the first user terminal and that at least one restriction is to be imposed on how the sponsored data connectivity is to be used by the first user terminal, wherein the sponsored data connectivity by the second user terminal, is a part of data connectivity quota of the second user terminal; and
a transmitter configured for transmitting, to the second user terminal, a token, wherein the token is further transmitted from the second user terminal to the first user terminal using proximity-based means; and
wherein the at least one restriction comprises:
a restriction on a location of the first user terminal for benefiting from the sponsored data connectivity; and
a restriction on an access network or access networks, which the first user terminal has to connect to for benefiting from the sponsored data connectivity.

23. A first user terminal for benefiting from a data connectivity, the first user terminal comprising:
a receiver configured for receiving, from a second user terminal, a token using proximity-based means, wherein the token is previously received by the second user terminal from a connectivity donation server; and
a processor configured for identifying, based on the token, the second user terminal's willingness to sponsor data connectivity of the first user terminal considering that at least one restriction is to be imposed on how the sponsored data connectivity is to be used by the first user terminal, wherein the sponsored data connectivity by the second user terminal, is a part of data connectivity quota of the second user terminal; and
wherein the at least one restriction comprises:
a restriction on a location of the first user terminal for benefiting from the sponsored data connectivity; and
a restriction on an access network or access networks, which the first user terminal has to connect to for benefiting from the sponsored data connectivity.

* * * * *